United States Patent [19]

Yamamoto et al.

[11] Patent Number: 5,740,777
[45] Date of Patent: Apr. 21, 1998

[54] IN-CYLINDER INJECTION INTERNAL COMBUSTION ENGINE

[75] Inventors: Shigeo Yamamoto; Hiromitsu Ando; Osamu Hirako; Hiroshi Tanada; Kyoya Igarashi; Hiroaki Miyamoto, all of Tokyo, Japan

[73] Assignee: Mitsubishi Jidosha Kogyo Kabushiki Kaisha, Tokyo, Japan

[21] Appl. No.: 765,927

[22] PCT Filed: May 16, 1996

[86] PCT No.: PCT/JP96/01292

§ 371 Date: May 8, 1997

§ 102(e) Date: May 8, 1997

[87] PCT Pub. No.: WO96/36808

PCT Pub. Date: Nov. 21, 1996

[30] Foreign Application Priority Data

May 16, 1995 [JP] Japan .................................. 7-117558
Sep. 11, 1995 [JP] Japan .................................. 7-233131

[51] Int. Cl.[6] ................................................. F02B 5/00
[52] U.S. Cl. ..................................................... 123/305
[58] Field of Search ............................ 123/305, 276, 123/675, 436, 680, 679, 682

[56] References Cited

U.S. PATENT DOCUMENTS

| 5,170,759 | 12/1992 | Ito ............................. | 123/276 |
| 5,205,254 | 4/1993 | Ito et al. .................... | 123/305 |
| 5,628,290 | 5/1997 | Iida et al. .................. | 123/305 |
| 5,642,706 | 7/1997 | Wirth et al. ................ | 123/305 |

FOREIGN PATENT DOCUMENTS

| 1-159460 | 6/1989 | Japan ......................... | 123/305 |
| 1-273873 | 11/1989 | Japan ......................... | 123/305 |
| 2-238164 | 9/1990 | Japan ......................... | 123/305 |
| 4-116264 | 4/1992 | Japan ......................... | 123/305 |
| 4-166612 | 6/1992 | Japan ......................... | 123/305 |
| 5-231266 | 9/1993 | Japan ......................... | 123/305 |
| 5-240047 | 9/1993 | Japan ......................... | 123/305 |
| 6-081651 | 3/1994 | Japan ......................... | 123/305 |

*Primary Examiner*—Raymond A. Nelli

[57] ABSTRACT

This invention relates to a 4-cycle in-cylinder injection internal combustion engine in which fuel is injected directly into a combustion chamber, and specifically to an in-cylinder injection internal combustion engine suited for use as an internal combustion engine which performs premixed combustion at the time of a high power output but stratified combustion at the time of a low power output and switches the state of each of the combustions depending on an operation state of the engine.

10 Claims, 26 Drawing Sheets

F I G. 6
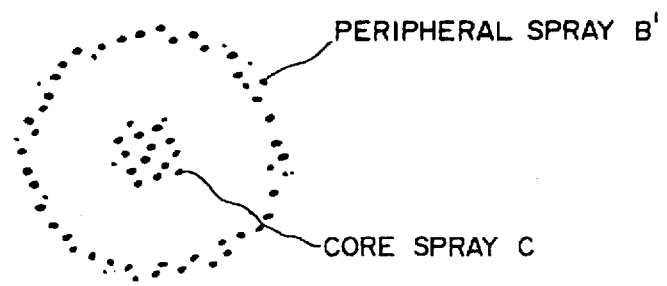

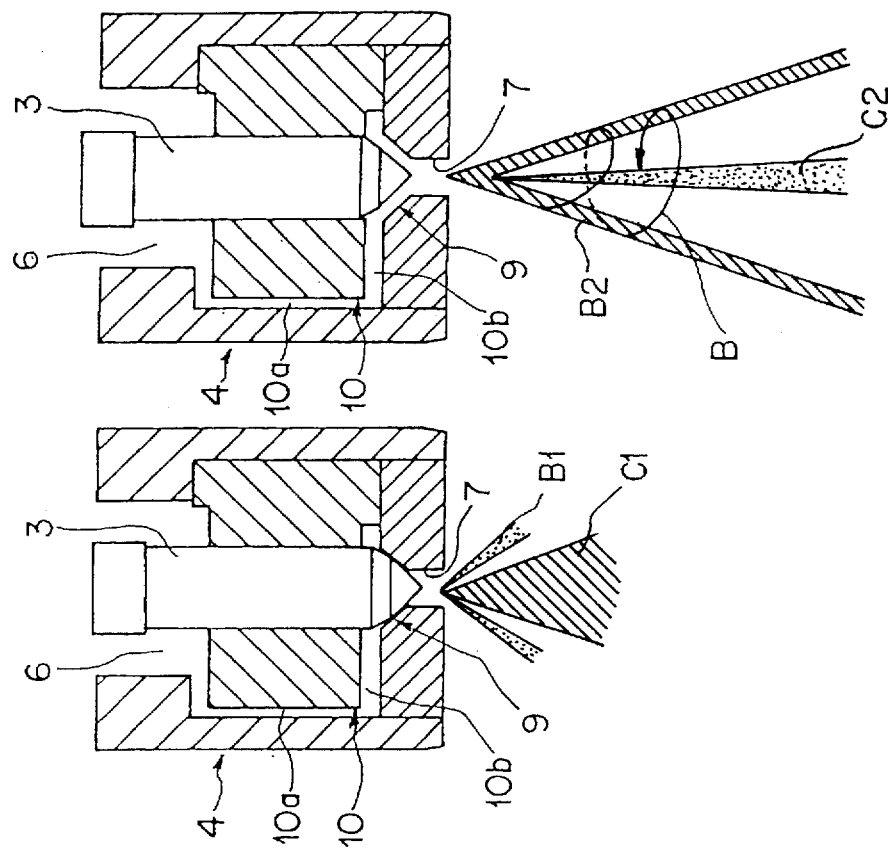

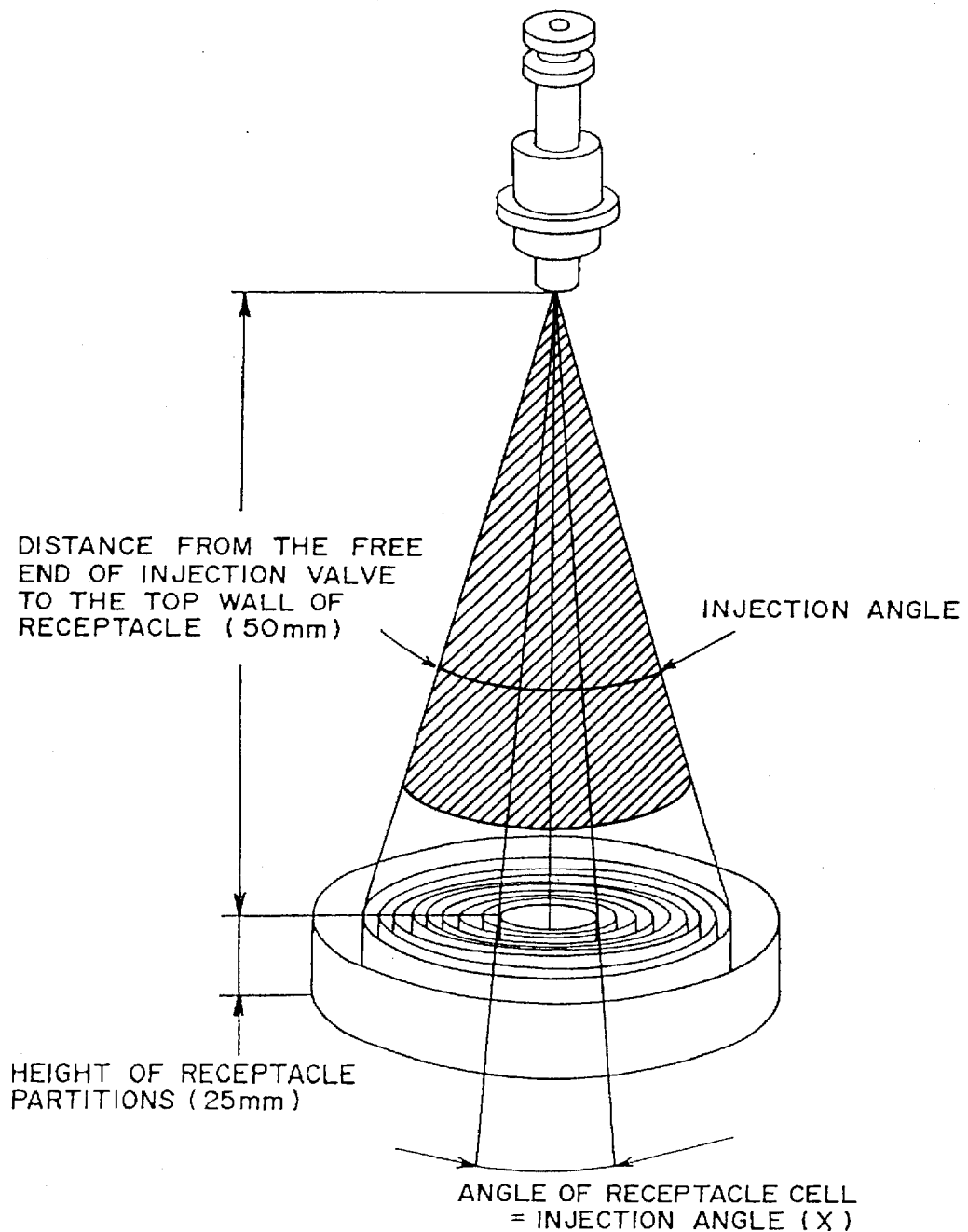

F I G. 10
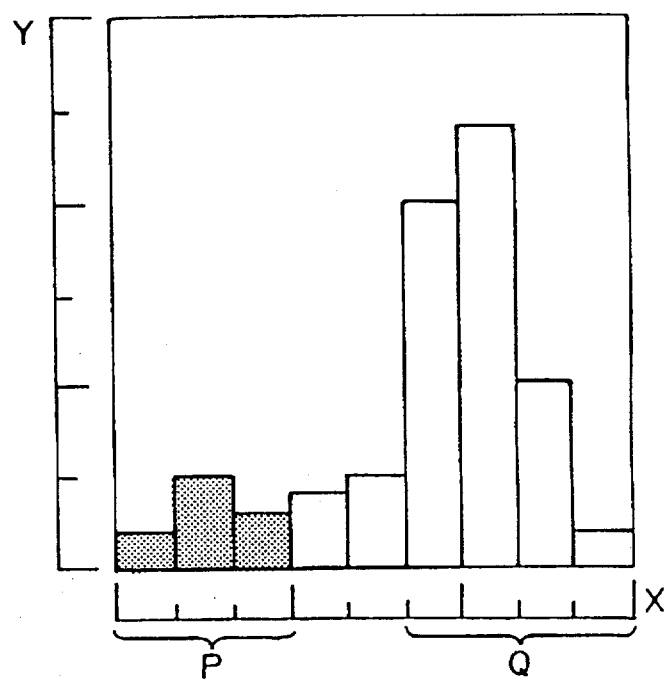

FIG. 12
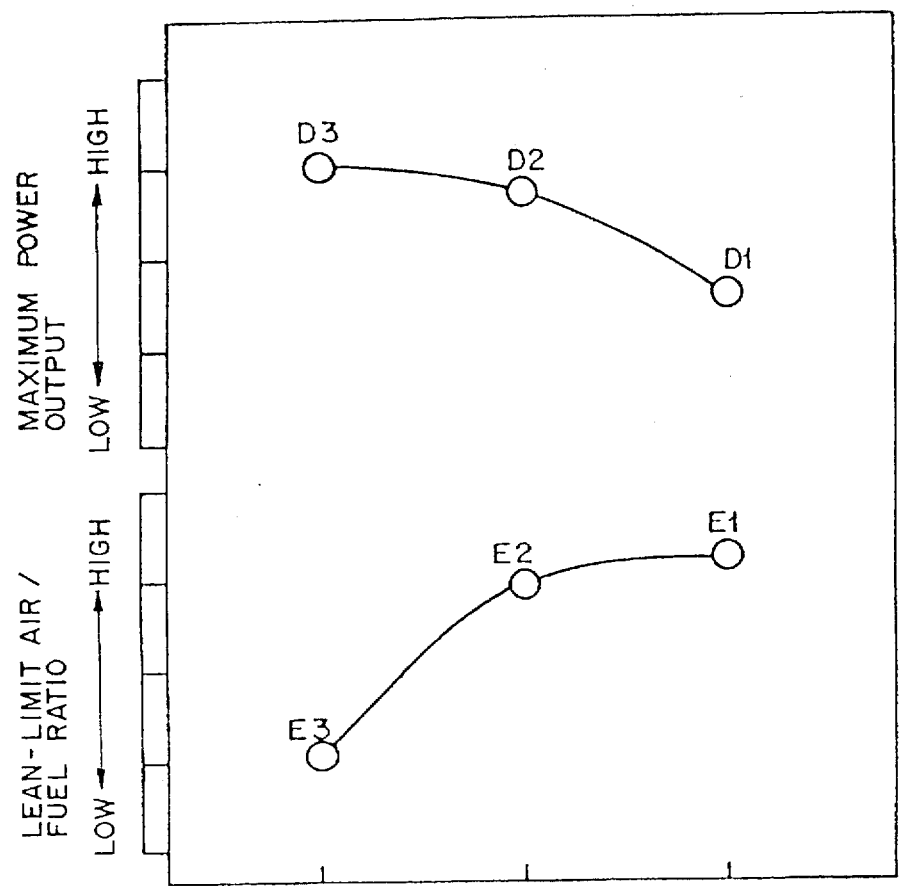
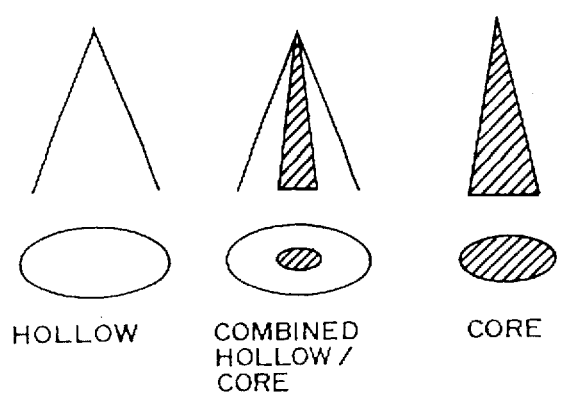
HOLLOW    COMBINED    CORE
          HOLLOW/
          CORE INJECTION IN FORMER STAGE OF INTAKE STROKE
(PRESSURE OF INJECTION ATMOSPHERE:
NOT HIGHER THAN ATMOSPHERIC PRESSURE)

INJECTION IN LATTER STAGE OF COMPRESSION STROKE
(PRESSURE OF INJECTION ATMOSPHERE: 0.2 TO 1.0 MPa)

F I G. 24
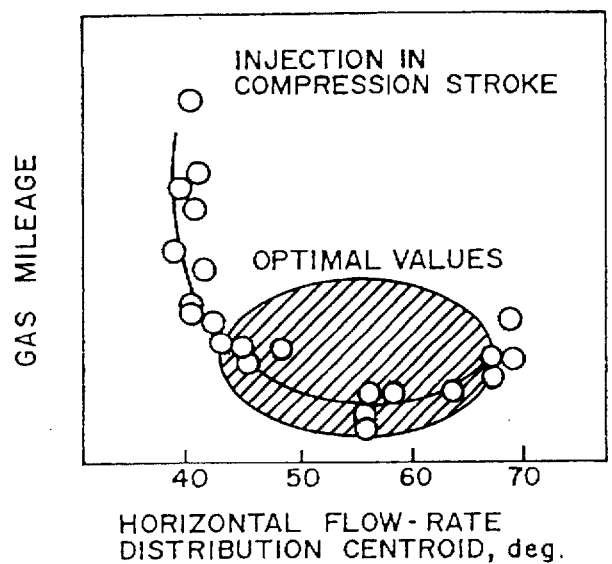

SPRAY NOZZLE LENGTH L

SPRAY NOZZLE DIAMETER Do

CROSS-SECTIONAL AREA As OF SWIRL-PRODUCING GROOVE

SWIRLING COMPARTMENT

SWIRLING DIAMETER Ds

SWIRL-PRODUCING GROOVE

FLOW VELOCITY Vs IN SWIRLING COMPARTMENT

FLOW OF SPRAY THROUGH SPRAY NOZZLE

⟶ VECTOR OF SPRAY PARTICLES

INJECTION PRESSURE : 4 MPa

IN-CYLINDER INJECTION INTERNAL COMBUSTION ENGINE

DESCRIPTION

1. Technical Field

This invention relates to an in-cylinder injection internal combustion engine in which fuel is injected directly into a combustion chamber, and specifically to a 4-cycle in-cylinder injection internal combustion engine suited for use as an internal combustion engine which performs premixed combustion at the time of a high power output but stratified combustion at the time of a low power output and switches the state of each of the combustions depending on an operation state of the engine.

2. Background Art

Internal combustion engines such as gasoline engines conventionally included those making use, as a fuel injection system, of such an intake-port fuel injection system that fuel is injected into an intake port by a fuel injection valve arranged in the intake port.

According to this intake-port fuel injection system, inducted air and fuel are mixed in an intake port, and the resulting air-fuel mixture is guided into a combustion chamber so that the air-fuel mixture can be ignited to burn in the combustion chamber.

Also included are those making use of a direct injection system that a fuel injection valve is arranged to inject fuel directly into a combustion chamber and fuel is injected directly into the combustion chamber to make it possible to improve the responsibility of an engine.

In the field of developments of internal combustion engines in recent years, research and development activities have been pursued toward stratified-combustion internal combustion engines of such a type that the combustion of fuel in a combustion chamber can be efficiently performed by forming a vertical flow of inducted air within the combustion chamber, that is, a so-called tumble flow.

As such a stratified-combustion internal combustion engine, an in-cylinder injection internal combustion engine in which fuel is injected directly into a combustion chamber is advantageous. Namely, realization of the above-mentioned stratified-combustion internal combustion engine as an in-cylinder injection internal combustion engine makes it possible to efficiently conduct the combustion of fuel in a combustion chamber while making an improvement in the responsibility of the engine. Therefore a great deal of active research is also under way concerning the in-cylinder injection of fuel.

In the meantime, concerning the above-mentioned stratified-combustion internal combustion engines, there has been developed a technology that performs an operation at an air/fuel ratio leaner than a stoichiometric air/fuel ratio (a lean burn operation) when the engine is required to produce a small power output but that performs an operation at a stoichiometric air/fuel ratio (stoichiometric burn operation) when the engine is required to produce a large power output.

When an engine is required to produce a large power output, for example, as in the case of an operation of the engine under a high load, it is desired to inject fuel in an intake stroke by a fuel injection valve so that uniform mixing throughout the internal space of the combustion chamber can be promoted without interference with the combustion chamber owing to a disturbance subsequent to a collapse of a tumble flow.

When the engine is required to produce a small power output as in the case of an operation of the engine under a low load, on the other hand, it is necessary to achieve an improvement in gas mileage at a relatively small injection rate of fuel while assuring sufficient ignitability and stable combustibility by injecting fuel in a compression stroke and then to locally form a relatively rich, combustible air/fuel mixture in a vicinity of a spark plug in a top part of the combustion chamber while making use of a tumble flow.

Incidentally, the shape of a spray of fuel by an fuel injection valve strongly affects not only an attempt to permit uniform spreading of combustion throughout the internal space of a combustion chamber but also an attempt to centralize fuel, for example, in a vicinity of a spark plug.

In Japanese Patent Application Laid-Open (Kokai) No. HEI 1-273873, a fuel injection valve is proposed, which can achieve an improvement in the diffusibility of fuel into a combustion chamber and an improvement in ignitability owing to assurance of a supply of fuel to a vicinity of a spark plug over an entire operation range of an in-cylinder injection spark-ignition engine without relying upon a swirl of inducted air. According to this fuel injection valve, the single fuel injection valve performs an injection of fuel having high self-diffusibility from a main spray nozzle toward the whole internal space of a combustion chamber and also an injection of fuel having large penetrativeness from a subordinate spray nozzle toward a spark plug. An in-cylinder injection spark-ignition engine provided with the above fuel injection valve is proposed there.

According to the proposal of Japanese Patent Application Laid-Open (Kokai) No. HEI 1-273873, fuel injection is however performed in the same mode no matter whether the load on the engine is high or low, in other words, no matter whether it is a fuel injection in an intake stroke or a fuel injection in a compression stroke. When the proportion of fuel to be injected through the main spray nozzle is set at a large value, it is therefore difficult to obtain an air/fuel ratio suitable for ignition by an injection of fuel from the subordinate spray nozzle at the time of a low load, in other words, there is a limitation to the reduction of a fuel quantity at the time of a low load. When the proportion of fuel to be injected through the subordinate spray nozzle is set at a large value, on the other hand, another problem arises to the effect that the air/fuel ratio in the vicinity of the spark plug becomes too high at the time of a high load under which fuel is injected in a large quantity.

The present invention has been completed with the above-described problems in view. An object of the present invention is therefore to provide an in-cylinder injection internal combustion engine in which the injection quantity and injection timing of fuel are changed to make the shape of a spray of fuel from a fuel injection valve suitable for an operation state of the engine so that the performance of the engine can be fully exhibited.

DISCLOSURE OF THE INVENTION

To achieve the above-mentioned object, the present invention provides a 4-cycle in-cylinder injection internal combustion engine provided with a combustion chamber formed between a top wall of a reciprocating piston fittedly inserted in a cylinder and a lower wall of a cylinder head, a single fuel injection valve for injecting fuel directly into the combustion chamber and a spark plug facing on the combustion chamber, characterized in that the fuel injection valve performs an injection of fuel into the combustion chamber in the form of a spray evenly spreading out in a conical shape from a spray nozzle as a vertex in a direction of an axis of the fuel injection valve; wherein, when the engine is in an operation state in which fuel is required in a large quantity, performs the injection of fuel in an intake stroke of the engine and, when the engine is in an operation state in which fuel is required in a small quantity, performs the injection of fuel so that fuel is fed in a latter half of a compression stroke of the engine in which an internal cylinder pressure is higher than that in the intake stroke.

Owing to the above constitution, fuel can be efficiently supplied depending on the quantity of fuel required despite the simplification in construction by the adoption of the single fuel injection valve. This has made it possible to simultaneously achieve an improvement in the power output of the engine and an improvement in gas mileage by a stable lean-burn operation. This is also advantageous from the standpoint of purification of exhaust gas. Further, the injection of fuel in a latter half of a compression stroke under a high internal cylinder pressure has the merit that the stratification of fuel and air can be promoted owing to centralization of a spray.

When fuel is required in a small quantity, the fuel injection valve may preferably perform the injection of fuel into said combustion chamber where an atmospheric pressure has reached 2 atm or higher.

This ensures centralization of a leading end of a spray of fuel from the fuel injection valve, thereby bringing about the effect that the stratification of fuel and air can be promoted further.

Preferably, the spray of fuel injected from the fuel injection valve may have a shape conically spreading out at a predetermined injection angle toward a leading end of the spray when fuel is required in a large quantity, and, when fuel is required in a small quantity, may have a shape that toward the leading end of the spray, a degree of diametrical spreading of the spray becomes progressively smaller and the shape is then gradually reduced in diameter.

As a consequence, when fuel is required in a large quantity, the diffusion of fuel throughout the combustion chamber can be promoted so that the combustion of fuel is efficiently conducted to facilitate the provision of a large power output. When fuel is required in a small quantity, the diffusion of fuel is suppressed so that a highly fuel-rich state can be locally produced within the combustion chamber. This makes it possible to achieve an operation at a low fuel consumption, for example, by controlling the air/fuel ratio lean in the combustion chamber as a whole while assuring ignitability by producing a highly fuel-rich state only in the vicinity of the spark plug.

Also preferably, a recess may be formed at a part of the top wall of the piston and the spark plug may be arranged at a position opposite the recess, whereby, when fuel is required in a large quantity, the leading end of the spray spreads out of the recess and diffuses in the combustion chamber and, when fuel is required in a small quantity, the leading end of the spray is guided toward the spark plug by the recess while being reduced in diameter so that, when the leading end of the spray reaches the top wall of the piston, the free end of the spray is received in the recess and is locally positioned in a vicinity of an ignition point of the spark plug.

Accordingly, when fuel is required in a large quantity, the diffusion of fuel throughout the combustion chamber can be promoted so that the combustion of fuel is efficiently conducted to facilitate the provision of a large power output. When fuel is required in a small quantity, fuel is locally supplied into the recess in the combustion chamber and under the guidance by the recess, the fuel is caused to centralize so that the fuel is localized only in the vicinity of the ignition point of the spark plug. It is therefore possible achieve an operation at a low fuel consumption by controlling the air/fuel ratio lean in the combustion chamber as a whole while assuring stable ignitability of fuel.

The fuel injection valve may preferably be a swirl-type fuel injection valve provided with an injection valve main body having the spray nozzle, open/close means arranged within the injection valve main body for opening/closing the spray nozzle, and swirl-producing means arranged in the open/close means for forming fuel, which flows through the injection valve main body, into a cone-shaped swirl.

The swirl-type fuel injection valve can effectively achieve centralization of a spray under high internal pressure conditions and also spreading of a spray under low internal pressure condition. This makes it possible to more efficiently feed fuel, thereby further promoting improvements in the power output and gas mileage of the engine. Significant effects can be brought about especially when applied to an engine which performs premixed combustion at the time of a high power output and stratified combustion at the time of a low power output.

Preferably, the engine may be provided further with: an intake port formed in the lower wall of the cylinder head on one side of a reference plane, in which a central axis of the cylinder is contained, and an intake valve arranged in the intake port to open or close an opening of the intake port to the combustion chamber; a curved wall recess formed in the top wall of the cylinder at a position faciing the opening of the intake port on the one side of the reference plane so that the recess is set back relative to the top wall of the cylinder to promote vertical swirl of inducted air advanced from the intake port into the combustion chamber; a raised portion formed on the top wall of the cylinder on an opposite side of the reference plane with a top portion of the raised portion being arranged near the reference plane so that the raised portion rises from the recess and approaches close to the lower wall of the cylinder head at a top dead center of the piston; a spark plug may be arranged on the lower wall of the cylinder head at a position near the central axis of the cylinder; and wherein the spray nozzle of the fuel injection valve may be arranged so that the spray nozzle is directed toward the recess.

By this constitution, good ignitability can be assured at the spark plug, thereby making it easier to stably perform a lean-burn operation by an extremely lean air-fuel mixture. An improvement in gas mileage can therefore be promoted further.

The shape of the spray may preferably be composed of a core spray, which has a small spray angle so that the core spray concentrates in a vicinity of the axis of the fuel injection valve, and a conical peripheral spray having a greater spray angle than the core spray and spaced apart from the core spray to surround an outer periphery of the core spray.

This makes it possible to more efficiently perform the feeding of fuel while suitably using the core spray and the peripheral spray. While achieving an improvement in the power output of the engine, the gas mileage can also be improved by performing a lean burn operation while fully assuring combustion stability.

In the above case too, the fuel injection valve may preferably be a swirl-type fuel injection valve provided with an injection valve main body having a spray nozzle, open/close means arranged within the injection valve main body for opening/closing the spray nozzle, and swirl-producing means arranged in the open/close means for forming fuel, which flows through the injection valve main body, into a cone-shaped swirl.

As a consequence, the swirl-type fuel injection valve can effectively achieve centralization of a spray under high internal pressure conditions and also spreading of a spray under low internal pressure condition by suitably using the core spray and the peripheral spray. This makes it possible to more efficiently feed fuel, thereby further promoting improvements in the power output and gas mileage of the engine. Further, significant effects can be brought about especially when applied to an engine which performs premixed combustion at the time of a high power output and stratified combustion at the time of a low power output.

Preferably, the shape of the spray of fuel injected from the fuel injection valve may be set so that, when the fuel is injected in a former half of an intake stroke, the spray has a shape progressively enlarged in diameter at an angle equal to or graeter than a predetermined angle toward a leading end of the spray and, when the fuel is injected in a latter half of a compression stroke, the spray has a shape progressively reduced in diameter at an angle smaller than the predetermined angle toward the leading end of the spray; and wherein a recess may be formed in the top wall of the piston at a part thereof, and at substantially the same piston position [for example, 60° after or before a top dead center (TDC) of the piston] in the former half of the intake stroke or in the latter half of the compression stroke, an outer edge of the recess may be set smaller than a spray contour of the outer end of the spray reaching the top wall of the piston when said fuel is injected from the fuel injection valve during the former half of the intake stroke and the piston is at a certain position, and the outer edge of the recess is set greater than a spray contour of the outer end of the spray reaching the top wall of the piston when the fuel is injected from the fuel injection valve during the latter half of the compression stroke and the piston is at about the certain position.

Upon injection of fuel by the fuel injection valve in the former half of the intake stroke, the above constitution allows the fuel to diffuse not only in the recess but also throughout the combustion chamber so that a sufficient quantity of fuel can be fed to the whole part of the combustion chamber while mixing it with air. As a consequence, it becomes easier to efficiently obtain a large power output. Upon injection of fuel by the fuel injection valve in the latter half of the compression stroke, the fuel can be controlled in the recess so that a sufficient fuel concentration can be achieved in the recess or in a space above the recess. It is therefore possible to achieve an operation at a low fuel consumption with the combustion chamber maintained in a state of a low fuel concentration as a whole while assuring stable ignitability of fuel. Significant effects can therefore be brought about especially when applied to an engine which performs premixed combustion at the time of a high power output and stratified combustion at the time of a low power output.

Preferably, the fuel injection valve may be a swirl-type fuel injection valve provided with an injection valve main body having the spray nozzle, open/close means arranged within the injection valve main body and having a contact portion, which can be brought into close contact with an inner peripheral wall forming the spray nozzle at a free end thereof, and swirl-producing means arranged right above the contact portion for guiding fuel, which flows inside the injection valve main body, toward the spray nozzle so that a swirling component is imparted to the flowing fuel to product a swirl; a ratio (L/D) of a length (L) from the contact portion to a free end of the spray nozzle to a smallest inner diameter (D) of the spray nozzle may be set within a range of from 1 to 3 so that an angle of a horizontal flow rate distribution centroid of fuel injected from the fuel injection valve, as obtained by measuring a horizontal flow rate distribution, falls within a range of from 40 to 70 degrees; and a value (Re/√P) having a unit of $[1/MPa^{0.5}]$ and obtained from a swirling Reynolds number (Re) at the spray nozzle, said swirling Reynolds number being defined based on a swirling diameter (Ds) of the swirl, a swirling velocity (Vs) of the swirl and a kinematic viscosity (v) of fuel in accordance with a formula $[Re=Ds \cdot Vs/(2 \cdot v)]$, and an injection pressure (P) of the fuel injection valve may be set within a range of from 10,000 to 20,000.

This makes it possible to obtain a fuel spray angle capable of achieving an optimal gas mileage available from combustion characteristics by an injection in the compression stroke while avoiding machining variations of the injection valve and also deposition of carbon in the spray nozzle.

BRIEF DESCRIPTION OF THE DRAWINGS

FIG. 2(a) and FIG. 2(b) are both views illustrating an open/close mechanism (open/close means) of the fuel injection valve for the internal combustion engine according to the first embodiment of the present invention, in which FIG. 2(a) is a schematic cross-sectional view depicting the open/close mechanism of the fuel injection valve and FIG. 2(b) is a cross-sectional view taken along the line I—I of FIG. 2(a);

FIG. 6 is a view for explaining the shape of the spray of fuel injected by the fuel injection valve for the internal combustion engine according to the first embodiment of the present invention, and is a transverse cross-sectional view of the spray of fuel in FIG. 5;

FIG. 7(a) and FIG. 7(b) are both fragmentary schematic cross-sectional views of the fuel injection valve for the internal combustion engine according to the first embodiment of the present invention, for explaining a fuel-injecting operation by the fuel injection valve, in which FIG. 7(a) shows a state shortly after initiation of an injection and FIG. 7(b) depicts a normal state in a middle stage of the injection;

FIG. 8(a) and FIG. 8(b) are both injected fuel distribution diagrams for explaining a fuel-injecting operation by the fuel injection valve for the internal combustion engine according to the first embodiment of the present invention, in which FIG. 8(a) shows a normal state in a middle stage of an injection and FIG. 8(b) depicts a state shortly before initiation of the injection or shortly before completion of the injection;

FIG. 9 is a schematic perspective view for explaining a measurement method of a distribution of fuel injected by the fuel injection valve for the internal combustion engine according to the first embodiment of the present invention;

FIG. 10 is an injected fuel distribution diagram for explaining a fuel-injecting operation by the fuel injection valve for the internal combustion engine according to the first embodiment of the present invention;

FIG. 11(a) and FIG. 11(b) are both schematic side views of a combustion chamber for showing the in-cylinder injection internal combustion engine according to the first embodiment of the present invention and also for explaining a fuel injection in a compression stroke by the fuel injection valve for the internal combustion engine, in which FIG. 11(a) shows a state of fuel upon injection of the fuel and FIG. 11(b) depicts a state of fuel after injection of the fuel;

FIG. 12 is a diagram for explaining an action and effects of the fuel injection valve for the internal combustion engine according to the first embodiment of the present invention;

FIG. 14(a) and FIG. 14(b) are both views illustrating the state of a spray of fuel in an intake stroke by a fuel injection valve for an internal combustion engine according to a second embodiment of the present invention, in which FIG. 14(a) is a schematic side view of the spray and FIG. 14(b) is a transverse cross-sectional view of the spray [a cross-sectional view taken along the line B—B of FIG. 14(a)];

FIG. 15(a) and FIG. 15(b) are both views showing the state of a spray of fuel in a compression stroke by the fuel injection valve for the internal combustion engine according to the second embodiment of the present invention, in which FIG. 15(a) is a schematic side view of the spray and FIG. 15(b) is a transverse cross-sectional view of the spray [a cross-sectional view taken along the line B—B of FIG. 15(a)];

FIG. 24 is a diagram for explaining about the setting of a spray nozzle of a fuel injection valve for an internal combustion engine according to the present invention, and is a diagram showing gas mileage characteristics relative to fuel spray characteristics (horizontal flow-rate distribution centroids);

FIG. 25(a) and FIG. 25(b) are both views for explaining about the setting of a spray nozzle in a fuel injection valve for an internal combustion engine according to the present invention and correspond to FIG. 2(a) and FIG. 2(b), respectively, in which FIG. 25(a) is a vertical schematic cross-sectional view of the spray nozzle and its vicinity portion and FIG. 25(b) is a schematic transverse cross-sectional view of the spray nozzle and its vicinity portion;

BEST MODES FOR CARRYING OUT THE INVENTION

With reference to the drawings, a description will hereinafter be made about certain modes for carrying out the present invention.

(a) Description of the first embodiment

FIG. 1 through FIG. 13 illustrates the 4-cycle in-cylinder injection internal combustion engine of the natural air supply type according to the first embodiment of the present invention and also its fuel injection valve. The first embodiment will be described based on these drawings.

Figure 1:
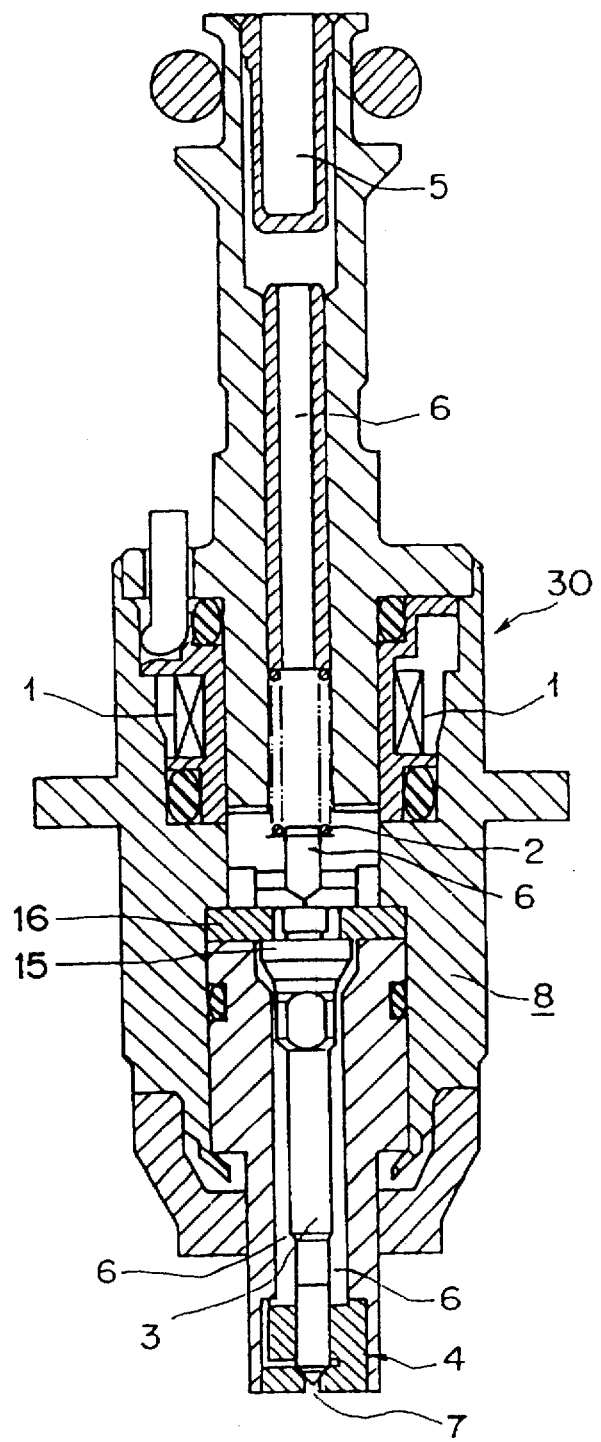
FIG. 1 is a schematic cross-sectional view illustrating a fuel injection valve for an internal combustion engine according to a first embodiment of the present invention.

The fuel injection valve 30 according to the present embodiment is to be arranged in an internal combustion engine such as an in-cylinder injection internal combustion engine, for example, for a vehicle, and as is illustrated in FIG. 1, is composed of a solenoid 1, a return spring 2, a needle valve 3, an open/close mechanism (open/close means) 4, a filter 5, a fuel flow passage 6, a spray nozzle 7, and a fuel injection valve main body 8.

Here, the filter 5 serves to allow fuel from an unillustrated fuel tank (fuel supply source) to pass therethrough while removing impurities and the like, and the fuel so passed is designed to flow into the fuel flow passage 6.

The solenoid 1 acts to cause compression of the return spring 2 when inputted with an electrical signal from ECU or the like (not shown) as a fuel injection control unit. The return spring 2 is connected to the needle valve 3. As a consequence, the needle valve 3 is movable up and down in the direction of expansion and compression of the return spring 2.

ECU as the fuel injection control unit outputs an electrical signal to the solenoid 1 to open the valve in an intake stroke of the engine when the engine is in an operation state requiring a large quantity of fuel as in the time of a high load, but outputs an electrical signal to the solenoid 1 to open the valve in a compression stroke of the engine when the engine is in an operation state requiring a small quantity of fuel as in the time of a low load.

It is to be noted that in a memory unit (ROM) in ECU as the fuel injection control unit, valve closing time data corresponding to operation states are stored so as to set a valve closing time in a latter half of a compression stroke upon setting a valve opening period in a compression stroke. ECU calculates a basic valve opening period on the basis of a pulse width data corresponding to a required fuel quantity and the above-mentioned valve closing time data, and operates the solenoid 1. Incidentally, to set an injection ending time in a latter half of a compression stroke upon performing an injection in the compression stroke, ECU may store valve opening time data corresponding at least to loads instead of the valve closing time data.

Namely, when an electrical signal is inputted to the solenoid 1, the return spring 2 is compressed under an action of the solenoid 1 so that the needle valve 3 is lifted. A maximum lift of the needle valve 3 is defined by a contact of a contacting portion 15 of the needle valve 3 with a stopper member 16 and, when the electrical signal to the solenoid 1 is eliminated, the return spring 2 restores its original shape so that the needle valve 3 also returns to its home position.

The open/close mechanism 4 can open or close the spray nozzle 7 as a result of the above-mentioned upward or downward movement of the needle valve 3. Specifically, it has such a construction as shown in FIG. 2(a), FIG. 2(b), FIG. 3 and FIG. 4.

Figure 2A:
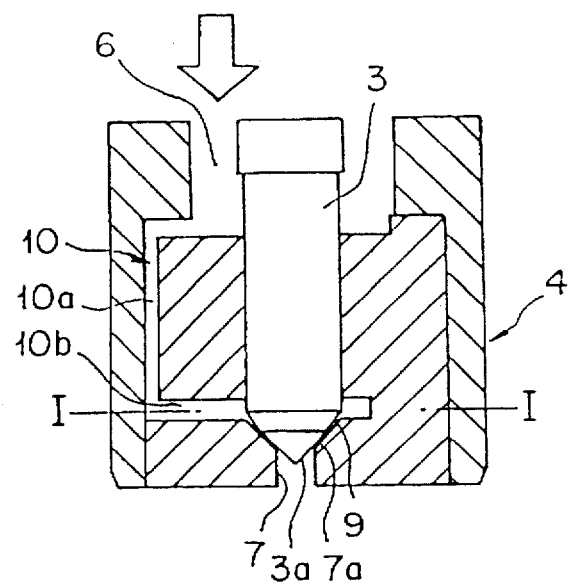

Referring now to FIG. 2(a), numeral 9 indicates a opening/closing portion (open/close means) which can open or close the spray nozzle 7. This opening/closing portion 9 is provided with a cone-shaped inner peripheral surface 7a, which forms the spray nozzle 7, and the needle valve 3.

The needle valve 3 is provided, at a free end portion thereof on a side of the spray nozzle 7, with a cone-shaped contact surface 3a which can be brought into close contact with the cone-shaped inner peripheral surface 7a, for example, by a line contact.

Accordingly, even when the cone-shaped contact surface 3a has worn out to a significant extent as a result of use of the fuel injection valve 30 over a long period of time, the cone-shaped contact surface 3a undergoes no change other than shifting of its position. It is therefore still possible to maintain the sealing between the fuel flow passage 6 and an unillustrated combustion chamber and hence to prevent fuel leakage from the spray nozzle 7.

Figure 2B:
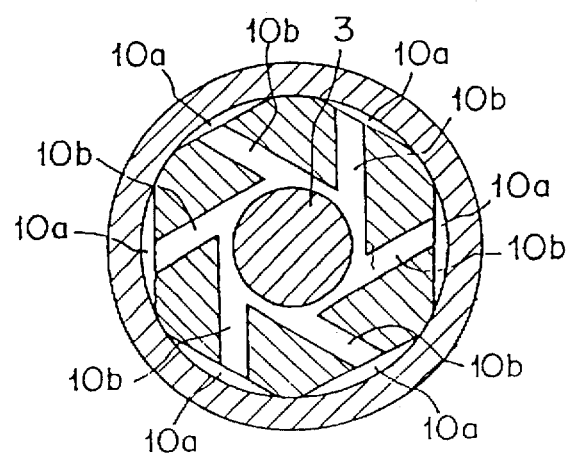

In FIG. 2(a) and FIG. 2(b), designated at numeral 10 is a fuel guide passage. This fuel guide passage 10 is swirling-flow producing means for imparting a swirling component to a flow of fuel from the fuel flow passage 6 while guiding the fuel toward the spray nozzle 6 from a peripheral side outer than the spray nozzle 7 on an upstream side of the spray nozzle 7, and is provided with an outer-periphery-side inlet portion 10a and a swirl-producing flow passage 10b.

The outer-periphery-side inlet portion 10a serves to guide the fuel from the fuel flow passage 6 to a position isolated toward an outer peripheral side from the spray nozzle 7, while the swirl-producing flow passage 10b is formed in a direction of a tangent extending from the outer-periphery-side inlet portion 10a toward an outer periphery of a free end portion of the needle valve 3 in the vicinity of the spray nozzle 7 and acts to apply a swirling component to a flow of fuel moving toward the spray nozzle 7.

Figure 3:
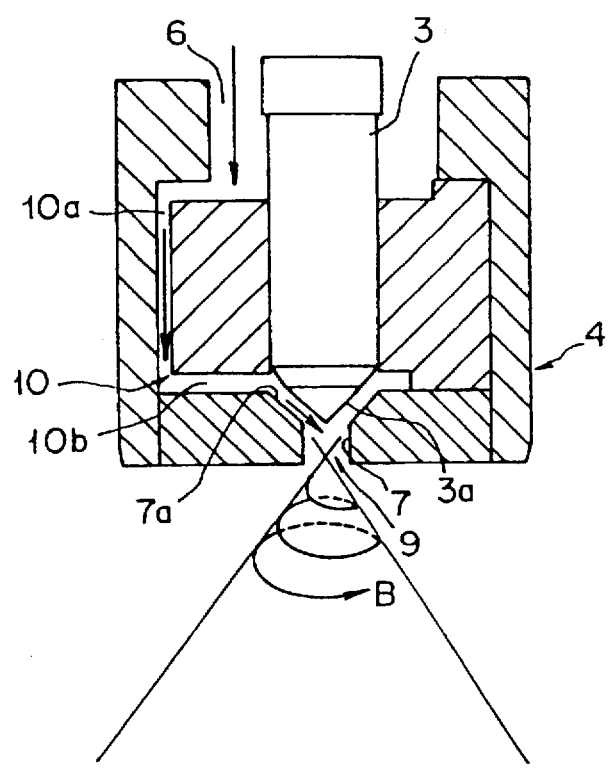
FIG. 3 is a schematic view for explaining the manner of formation of a cone-shaped swirl by the fuel injection valve for the internal combustion engine according to the first embodiment of the present invention.

When a swirling component is applied at the fuel guide passage 10 to the fuel flowing through the injection valve main body 8, a cone-shaped swirling flow B shown, for example, in FIG. 3 is therefore applied to the fuel to be injected through the opening/closing portion 9. In other words, the above-mentioned fuel guide passage 10 constitutes the swirling-flow producing means which is arranged in the opening/closing portion 9 for imparting the cone-shaped swirling flow (peripheral injection) B to the fuel flowing through the injection valve main body 8.

In other words, the fuel contained in the fuel flow passage 6 or the fuel guide passage 10 is maintained under a predetermined pressure while the opening/closing portion 9 is closed, but is released from the thus-applied pressure when the opening/closing means 9 is opened. As a result, a fuel flow in the form of the cone-shaped swirling flow B is produced in the swirl-producing flow passage 10b and is then injected into the unillustrated combustion chamber.

Incidentally, the above-described fuel flow which has been converted into the swirling flow in the swirl-producing flow passage 10b has a low initial velocity in a radial direction on a conical peripheral surface of a spray because an injection pressure in the injection valve has been converted into the swirling flow. On the other hand, the surrounding air prevents movements of the thus-sprayed fuel. As a consequence, the spray acts to form a swirling flow in the surrounding air, but the movement of the spray itself is progressively reduced with the position from the injection valve so that the spray tends to stall.

As is appreciated from the foregoing, the movement of the fuel sprayed in the form of a peripheral spray (peripheral injection) is prone to be affected by an internal cylinder pressure. When the internal cylinder pressure is low, sufficient penetrativeness is maintained in the radial direction on the conical peripheral surface and the dispersion of the fuel inside the cylinder is hence promoted. When the internal cylinder pressure is high, on the other hand, the density of the surrounding air is increased, leading to an increase in force which acts to prevent the movement of the spray. As a consequence, the movement of the sprayed fuel in the angular direction of the cone is progressively reduced with the position from the injection valve, whereby the spray tends to become smaller in spreading and to concentrate toward a central axis of the injection.

This means that an injection in an intake stroke contributes to even distribution of fuel in a cylinder and that an injection in a compression stroke contributes to stratification of fuel and air.

Figure 4:
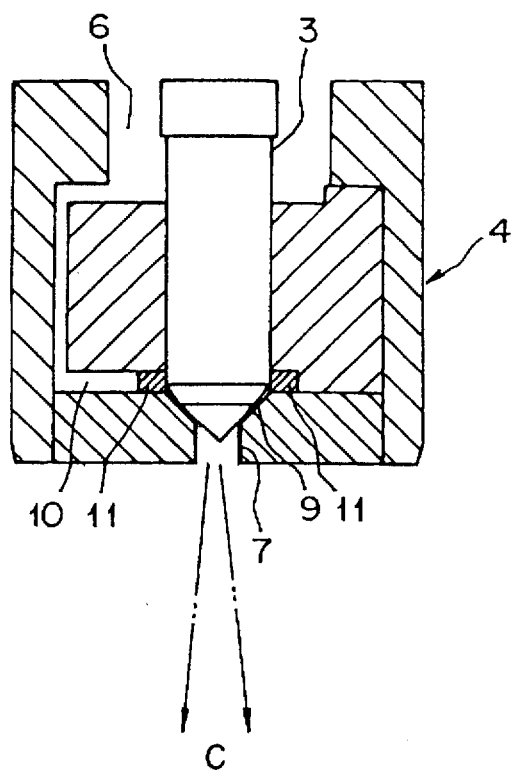
FIG. 4 is a schematic cross-sectional view showing the construction of a fuel-retaining portion in the fuel injection valve for the internal combustion engine according to the first embodiment of the present invention.

Referring next to FIG. 4, a dead volume (fuel-retaining portion) 11 is formed in a vicinity of the spray nozzle 7 to retain fuel during the closure of the spray nozzle 7. This dead volume 11 is formed in a part which is on an upstream side of the area of contact between the cone-shaped inner peripheral surface 7a and the cone-shaped contact surface 3a in the spray nozzle 7.

When the needle valve 3 is lifted, the fuel retained in the dead volume 11 is also pushed forward by the pressure of fuel from the fuel guide passage 10 and is injected, for example, as a core spray C into the unillustrated combustion chamber.

Figure 5:
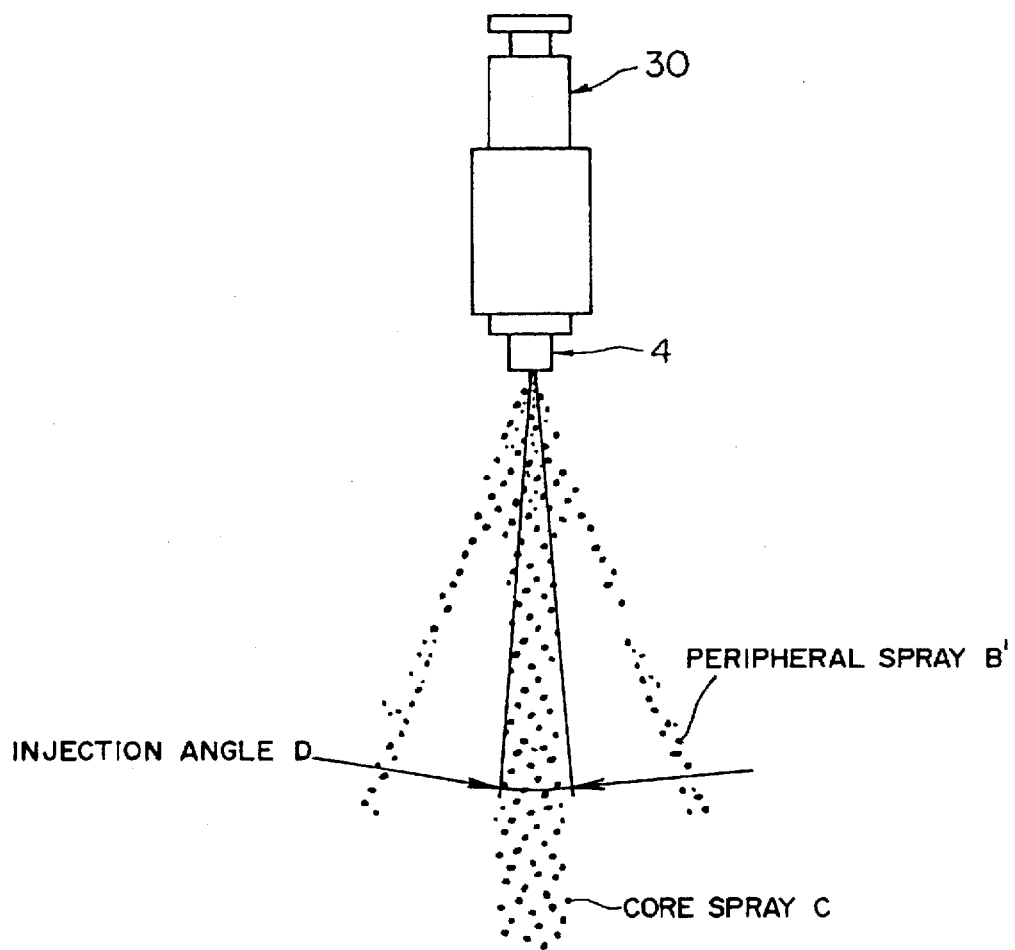
FIG. 5 is a schematic side view for explaining the shape of a spray of fuel injected by the fuel injection valve for the internal combustion engine according to the first embodiment of the present invention.

Therefore the shapes of sprays upon injection of the fuel contained in the fuel guide passage 10 and that retained in the dead volume 11 have, for example, such as forms as illustrated in FIG. 5 (a cross-section taken in a direction parallel to the direction of the injection) or in FIG. 6 (a cross-section taken in a direction perpendicular to the direction of the injection).

Described specifically, as shown in FIG. 5 or FIG. 6, a peripheral spray B' of a small fuel particle size is formed by the cone-shaped swirl flow B when the fuel contained in the fuel guide passage 10 is injected, but a core spray C of a fuel particle size larger than the peripheral spray is formed at a small injection angle D when the fuel retained in the dead volume 11 is injected.

The core spray formed from the dead volume 11 does not include a swirling flow and the injection pressure is converted into a velocity component in a vertical direction. Accordingly, even when the internal cylinder pressure is high, the core spray has sufficient directivity in the direction of the central axis of the injection. As a consequence, the core spray loses the velocity component, thereby producing such a flow that draws the suspended peripheral spray together with the surrounding air to a vicinity of the central axis of the injection. Therefore, the core spray contributes to the promotion of stratification in a compression stroke.

Upon opening of the needle valve 3, the above-described shapes of the spray of fuel shown in FIG. 5 and FIG. 6 change as shown in FIG. 7(a) and FIG. 7(b).

Firstly, in a state that no electrical signal is inputted to the solenoid 1 as an initial state, the return spring 2 undergoes neither expansion nor compression because it is free from any action from the solenoid 1. Hence, the position of the needle valve 3 does not change from the contacted position so that the fuel from the fuel guide passage 10 or the fuel retained in the dead volume 11 is not injected.

When an electrical signal is inputted to the solenoid 1, on the other hand, the return spring 2 begins to undergo compression under an action of the solenoid 1 so that the needle valve 3 is gradually lifted, resulting in gradual opening of the area of contact between the needle valve 3 and the spray nozzle 7.

In such an initial stage of opening of the needle valve 3, the fuel from the fuel guide passage 10 is injected in a small quantity with a spray shape (peripheral spray) indicated by B1 in FIG. 7(a), whereas the fuel retained in the dead volume 11 is injected in the form of a core with such a spray shape (core spray) as designated by C1 in FIG. 7(a). As a result, a fuel spray shape composed primarily of the core spray C1 can be formed.

Figure 8A:
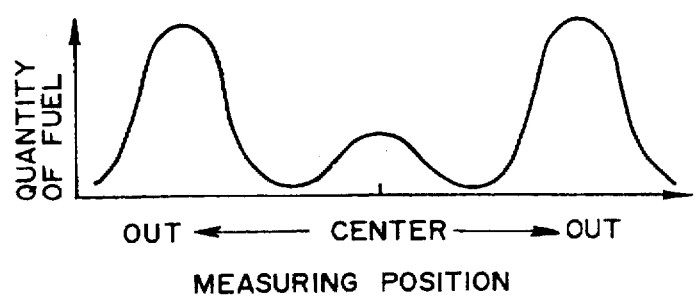
Figure 8B:
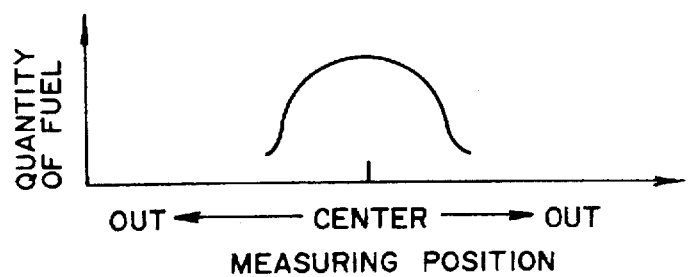

As overall proportions of the injected fuels, the quantity of the core spray C1 is greater than that of the peripheral spray B1 so that at a level below the spray nozzle 7, fuel is detected more around a center than on an outer side, for example, as shown in FIG. 8(b). Incidentally, the term "center" as used herein means a position right below the spray nozzle 7 while the term "outer" as used herein means a position remote from the center.

Subsequently, the return spring 2 is substantially compressed under the action of the solenoid 1 so that the position of the needle valve 3 is lifted significantly. The area of contact between the needle valve 3 and the spray nozzle 7 is therefore opened considerably.

In this case, the fuel from the fuel guide passage 10 is also injected in a large quantity with such a spray shape as designated by B2 in FIG. 7(b). On the other hand, the fuel retained in the deal volume 11 becomes gradually smaller in quantity as the lift of the needle valve 3 becomes greater, so that its injection quantity becomes smaller. Its spray shape therefore has such a form as indicated by C2 in FIG. 7(b). As a consequence, a fuel spray shape composed primarily of the peripheral spray B2 can be formed.

Described specifically, the quantity of the peripheral spray B2 is greater than that of the core spray C2 and at a level below the spray nozzle 7, fuel is detected more on the outer side than around the center, for example, as illustrated in FIG. 8(a).

Upon subsequent elimination of the electrical signal supplied to the solenoid, the action of the solenoid 1 is no longer in existence. Hence, the return spring 2 restores its original shape and the needle valve 3 also returns to its home position.

Concerning the total injection quantity over the entire period of from the opening to the closure of the fuel injection valve, the peripheral spray is greater than the core spray.

A fuel quantity distribution below the spray nozzle 7 upon injection of the fuel contained in the fuel guide passage 10 and that retained in the dead volume 11 can be measured, for example, by a horizontal flow-rate distribution measuring system making use of the 11 ring method, such as that shown in FIG. 9.

Here, numeral 12 indicates a multipoint collection receptacle for the measurement of a horizontal flow-rate distribution (ring-shaped collection device). This multipoint collection receptacle 12 for the measurement of a horizontal flow-rate distribution is of the construction that eleven (11) annular collection receptacles 12A having the wall height of 25 mm but different diameters are concentrically arranged. Sprays, which are periodically injected a plurality of times (for example, 1,000 times) at an injection pulse width of 1 msec and an angle defined as a cosine for a distance form the free end of the injection valve to a top wall of the receptacle (50 mm in this embodiment), are collected in the individual collection receptacles 12A, and the results of averaging of the quantities of fuel in the individual collection receptacles 12 are used as a horizontal flow-rate distribution.

The fuel (test oil) which is employed in the above measurement model is very close to gasoline in specific gravity and the like, and is an artificial fuel containing low boiling-point (low-volatility) components at low levels. According to the testing method specified under the JIS, fuel characteristics of this artificial fuel include a specific gravity of 0.77 at 15°/4° C., a viscosity of 1.17 to 1.23 (cst) at 20° C., a fractionation property [50% distillation temperature (°C.)] of 165, and another fractionation property [final point (°C.)] of 196.

As a result of measurement of a horizontal flow-rate distribution as measured with respect to such a peripheral spray as shown in FIG. 7(b) by using the measurement model illustrated in FIG. 9, proportions Y of fuel quantities relative to injection angles X can be obtained as illustrated in FIG. 10. In FIG. 10, a range P in which the injection angle is low can be considered to correspond to fuel quantities by the core spray C2, while a range Q in which the injection angle is large can be regarded as fuel quantities by the peripheral spray B2.

Figure 11A:
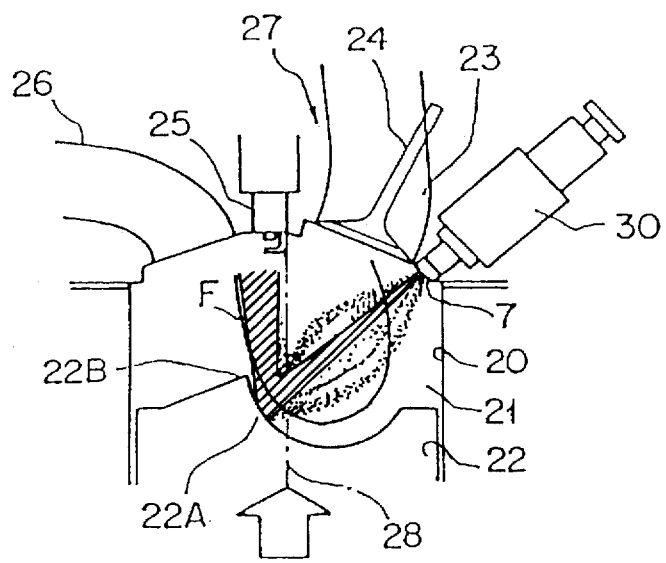
Figure 11B:
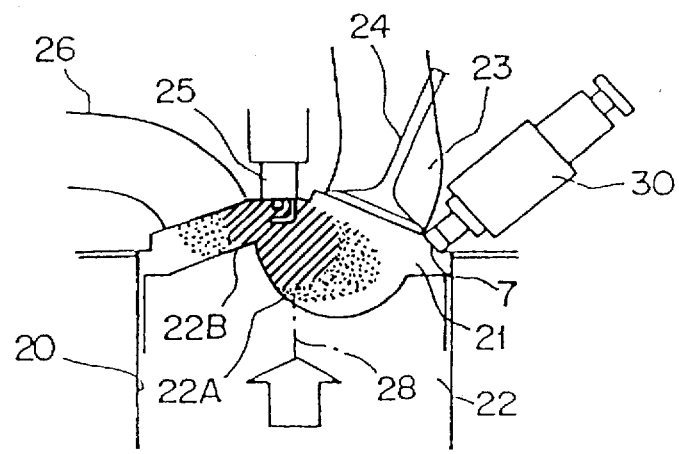
Figure 13:
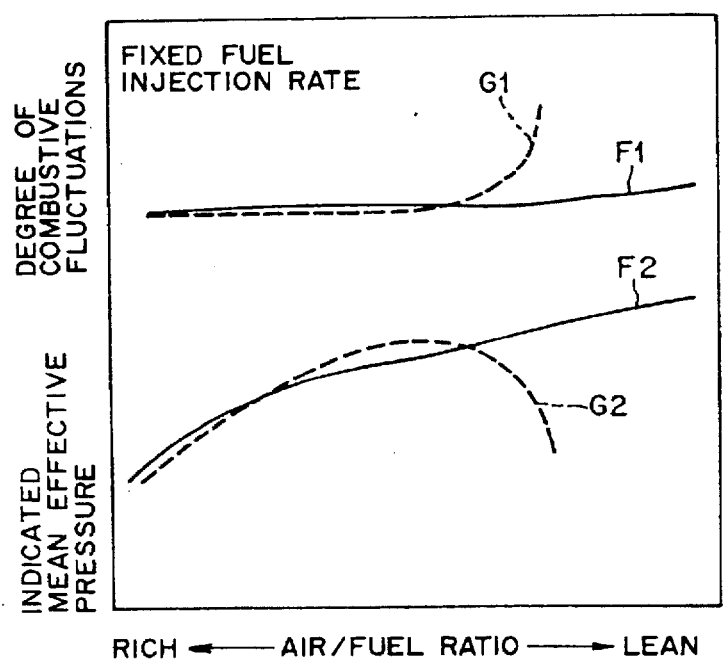
FIG. 13 is a diagram for explaining another action and other effects of the fuel injection valve for the internal combustion engine according to the first embodiment of the present invention.

Upon application of the above-described fuel injection valve 30 according to the present embodiment to a 4-cycle in-cylinder injection internal combustion engine of the natural air supply type without a supercharger on a vehicle, the fuel injection valve can be arranged, for example, at such a position as shown in FIG. 11(a) or FIG. 11(b).

In these FIG. 11(a) and FIG. 11(b), there are depicted a cylinder 20, a combustion chamber 21, a piston 22, an intake port 23, an intake valve 24, a spark plug 25, an exhaust valve 26, and a cylinder head 27.

The intake port 23 is formed in a lower wall of the cylinder head 27 on one side of a reference plane in which a central axis 28 of the cylinder 20 is contained, and the intake valve 24 is disposed in the intake port 23 so that it opens or closes an opening of the intake port to the combustion chamber 21.

Further, on a top wall of the piston 22, a curved wall recess 22A is formed at a position facing the opening of the intake port 23 on the one side of the reference plane (an imaginary plane containing the central axis 28 of the cylinder) in such a way that the curved wall recess is set back relative to the top wall of the cylinder 20 so as to promote a vertical swirl (tumble flow) F of inducted air advanced from the intake port 23 into the combustion chamber 21. In addition, a raised portion 22B—which gently rises from the recess 22A and at a top dead center of the piston 22, can be brought close to the lower wall of the cylinder head—is formed on the top wall of the cylinder 20 on an opposite side of the reference plane so that a top portion of the raised portion is located near the reference plane. It is to be noted that the raised portion 22B is not limited to gently-rising one such as that shown in FIG. 11(a) and FIG. 11(b) and may rise, for example, linearly from the recess 22A.

The spark plug 25 is arranged on the lower wall of the cylinder head 27 in a vicinity of the central axis 28 of the cylinder, and the fuel injection valve 30 is disposed so that its spray nozzle 7 is directed toward the recess 22A when the piston 22 is located in a predetermined range near the top deal center. As there is the condition that the injection is an in-cylinder injection, the fuel injection valve 30 is designed to be able to perform a fuel injection at a under a pressure significantly higher than the conventional intake-port injection.

In the internal combustion engine equipped with the above-described fuel injection valve 30, depending on whether a load to the internal combustion engine is high or low, the injection timing of the fuel injection valve is varied and the lifted period of the needle valve 3 is adjusted, both based on controls by ECU or the like (not shown), so that the fuel injection rate is controlled.

Described specifically, when the internal combustion engine is under a low load as in the time of stable running of a vehicle, the fuel injection valve is controlled so that in a compression stroke of a high internal cylinder pressure (2 atm or higher), fuel is fed into the combustion chamber for a shortened lifted period of the needle valve 3. Accordingly, a fuel injection composed primarily of the core spray C1 is performed as illustrated in FIG. 7(a).

In this case, the fuel sprayed primarily as the core spray C1 from the fuel injection valve 30 is guided to flow toward the spark plug 25 subsequent to its reflection by the inner wall of the recess 22A of the piston 22. This can make a vicinity of the spark plug 25 locally rich in fuel so that a saving in fuel cost can be achieved while assuring ignitability and combustion stability although the overall air/fuel ratio is controlled lean (compression-stroke injection mode).

When a high power output is required as in the time of a rapid acceleration of a vehicle, the load on the internal combustion engine become higher. In an intake stroke in which a flow of inducted air is guided form the intake port 23 into the combustion chamber 21 (in the intake stroke, the internal cylinder pressure is at atmospheric pressure or lower), a control is performed to inject fuel for a prolonged lifted time. Accordingly, spraying of fuel is performed in a form composed primarily of the peripheral spray B2 as depicted in FIG. 7(b), whereby the fuel is evenly mixed throughout the combustion chamber to obtain a sufficient power output by a stoichiometric operation or a rich operation (intake-stroke injection mode).

Since the fuel injection valve according to the first embodiment of the present invention is constructed as described above, upon application of the above-described fuel injection valve 30 to an in-cylinder injection internal combustion engine for a vehicle, the injection timing of the fuel injection valve and the lifted period of the needle valve 3 are varied based on controls by ECU or the like (not shown), depending on whether the load on the internal combustion engine is high or low.

Namely, when the load on the internal combustion engine is low as in the time of stable running of the vehicle, the fuel injection valve is controlled to perform an injection of fuel for a shortened lifted period of the needle valve 3 in a compression stroke, so that the quantity of fuel injected as the core spray C1 [see FIG. 7(a) or FIG. 7(c)] is increased and the quantity of fuel injected per lifting of the needle valve 3 is controlled at a relatively small value. In this manner, ignitability is fully assured (compression-stroke fuel injection mode).

In other words, by performing a fuel injection composed primarily of the core spray C1 in a compression stroke in which the piston ascends as indicated by an arrow and compresses an inducted air flow in the combustion chamber 21 as illustrated in FIG. 11(a) instead of injecting fuel in an intake stroke in which a flow of inducted air is guided from the intake port 23 into the combustion chamber 21, the core spray C1 is reflected at the inner wall of the recess 22A of the piston 22 in the combustion chamber 21 and after the reflection, flows toward the spark plug 25.

In particular, an injection of fuel in a latter stage of a compression stroke makes it easier to direct the fuel toward the spark plug 25 subsequent to its reflection at the inner wall of the recess 22A, because the recess 22A on the top wall of the piston 22 has ascended appropriately.

As the internal cylinder pressure is high at this time, it is possible to obtain a characteristic that the advancing course of the peripheral spray B1 is bent under the influence of the inner cylinder pressure to make the peripheral spray focused toward the core spray and the angle of the spray at the leading end of the spray is reduced (in other words, the outer diameter of the leading end of the spray of fuel reaching the top wall of the piston become smaller). While being focused toward the core spray C1, the peripheral spray B1 is therefore also caused to flow toward the spark plug 25 subsequent to its reflection at the inner wall of the recess 22A of the piston 22. Namely, the peripheral spray B1 can also be concentrated toward the spark plug 25 in the compression stroke.

As a result, a relatively rich, combustible air/fuel mixture is formed in the vicinity of the spark plug 25 as is shown in FIG. 11(b). In a combustion stroke subsequent to the compression stroke, ultra-lean stratified combustion can be performed by ignition through the spark plug 25.

FIG. 12 shows maximum power outputs and lean-limit air/fuel ratios of the engine depending on spray shapes. It illustrates characteristics relating to three types of spray shapes, that is, a hollow spray in the form of a substantially conical plane (abbreviated as "Hollow" in the diagram), a combined hollow/core spray formed in combination of the hollow spray and a core spray (abbreviated as "Combined hollow/core" in the diagram), and a core spray spreading in a somewhat conical core form (abbreviated as "Core" in the diagram).

As is diagrammatically illustrated, concerning the maximum power output of the engine, the "Hollow" indicated by D3 is the greatest, followed by the "Combined hollow/core" indicated by D2. Compared with these spray shapes, the "Core" designated by D1 is small. Regarding the lean-limit air/fuel ratio, the "Core" indicated by E1 and the "Combined hollow/core" designated by E2 are high conversely, and compared with these spray shapes, the "Hollow" indicated by E3 is low.

When the load on the internal combustion engine is low, the lean-limit air/fuel ratio can be made higher as indicated by E1 or E2 in FIG. 12 by performing a combined hollow/ core spray, which is composed primarily of the core spray C1, in a compression stroke of a high internal cylinder pressure as mentioned above [see FIG. 7(a)]. This can make the lean-limit air/fuel ratio higher so that the fuel injection rate can be limited to a relatively low rate.

Assuming that the fuel injection rate is fixed in the above-mentioned compression-stroke fuel injection mode, the combined hollow/core spray can stabilize the degree of combustive fluctuations compared with the other fuel spray shape (see G1) irrespective of the air/fuel ratio and can also maintain an indicated mean effective pressure F2 as opposed to the other fuel spray shape (see G2) even when the air/fuel ratio is changed from rich to lean. The combined hollow/ core spray can therefore perform combustion under ultra-lean conditions without reducing the power output, so that the fuel injection rate can be limited at a relatively low level.

Further, the load on the internal combustion engine becomes higher when a high power output is required as in the time of a rapid acceleration of the vehicle. In an intake stroke in which a flow of inducted air is guided from the intake port 23 into the combustion chamber, a control is therefore performed to inject fuel for a prolonged lifted period (intake-stroke fuel injection mode). This increases the quantity of fuel to be injected as the peripheral spray B2 [see FIG. 7(b)], the spray is allowed to spread into a wider space without interference with the combustion chamber 21, and the uniform mixing can be promoted to produce a higher power output.

Namely, by spraying fuel in a shape composed primarily of the peripheral spray B2 in the intake stroke, the flow of inducted air in the combustion chamber 21 and the spray are mixed together in the compression stroke subsequent to the intake stroke. As a consequence, an air-fuel mixture close to a stoichiometric air/fuel ratio is formed throughout the interior of the combustion chamber 21 and is then caused to burn in the subsequent combustion stroke, thereby making it possible to produce a higher power output.

Describing with reference to FIG. 12, it is understood that, when an internal combustion engine is under a high load, an injection of fuel in the form of a combined hollow/core spray or a hollow spray formed by omitting the core spray from the combined hollow/ core spray as shown in FIG. 7(b) can provide a sufficient engine power output as indicated by points D2 and D3 in FIG. 12.

As has been described above, the fuel injection valve according to the first embodiment of the present invention has an advantage that, when applied to an in-cylinder injection internal combustion engine on a vehicle, performance of a fuel injection composed primarily of a core spray by the compression-stroke fuel injection mode when the load on the internal combustion engine is low makes it possible to fully assure ignitability, namely, combustion stability while limiting the fuel injection rate at a relatively low level, to perform combustion under ultra-lean conditions without lowering the power output and thus to achieve an improvement in gas mileage.

When the load on the internal combustion engine is high, a fuel injection composed primarily of a peripheral spray is performed by the intake-stroke fuel injection mode. While performing the injection of fuel in a relatively small quantity, it is therefore possible to form an air-fuel mixture close to a stoichiometric air/fuel ratio and hence to produce a higher power output. There is accordingly an advantage that desired power can be produced while achieving an improvement in gas mileage.

In the above-described embodiment, when the fuel injection valve 30 is mounted on an in-cylinder injection internal combustion engine such as that illustrated in FIG. 11(a) and FIG. 11(b), it is particularly preferred to construct the fuel injection valve 30 in such a way that, when the load on the internal combustion engine is low, it performs a fuel injection under conditions that the internal cylinder pressure is obviously higher than that in an intake stroke (internal cylinder pressure: atmospheric pressure or lower), namely, in a compression stroke (especially, in its latter half) but that, when the load on the internal combustion engine is high, it performs a fuel injection in the intake stroke (especially, in its former half). Needless to say, advantages similar to those available from the above-described embodiment can also be brought about in this case.

In the above-described embodiment, the manner of a fuel injection was changed depending on whether the load on the internal combustion engine is high or low. According to the present invention, the fuel injection valve has two shapes of a core spray and a peripheral spray. There is accordingly an advantage that, when a fuel injection is performed in a compression stroke, an improvement in gas mileage can be achieved while fully assuring at least combustion stability.

Further, an in-cylinder injection internal combustion engine that switches the timing of an injection by using a single injection valve as in the present embodiment, when fuel is injected in a compression stroke and the fuel injection ending time is set in a latter half of the compression stroke, can make smaller a spray angle of a leading end of a peripheral spray (in other words, can make smaller an outer diameter of a leading end of a spray reaching a top wall of a piston) independently from a core spray owing to an internal cylinder pressure, can direct the spray toward a recess of the piston, can achieve combustion in an ultra-lean stratified state, and can hence bring about combustion stabilizing effects and gas-mileage improving effects. On the other hand, an injection in an intake stroke can diffuse a peripheral spray throughout a combustion chamber without any particular change to the spray angle of the leading end of the peripheral spray. It is therefore possible to form a uniform air-fuel mixture close to a stoichiometric air/fuel ratio and thus to produce a higher power output by an injection of fuel in a relatively small quantity.

Namely, it is possible to set spray angles suited for stratified combustion and pre-mixed combustion.

respectively, in a given in-cylinder injection internal combustion engine by arranging a single injection valve, which can perform a cone-shaped injection, and switching its injection time between a compression stroke and an intake stroke. A system which can meet requirements under respective operation states and has high cost merit can be furnished. This feature can also be brought about even if the core spray does not exist specifically.

(b) Description of the second embodiment

FIG. 14 through FIG. 20 show the in-cylinder injection internal combustion engine according to the second embodiment of the present invention, which is similar to the first embodiment, or the fuel injection valve for the internal combustion engine. Based on these drawings, the second embodiment will be described.

Compared with the above-described in-cylinder injection internal combustion engine according to the first embodiment as illustrated in FIG. 11(a) and FIG. 11(b), the in-cylinder injection internal combustion engine according to this embodiment is different in the shape of a fuel spray by the fuel injection valve but is basically similar in the remaining construction and action. Description of such similar construction and action are therefore omitted.

Figure 14A:
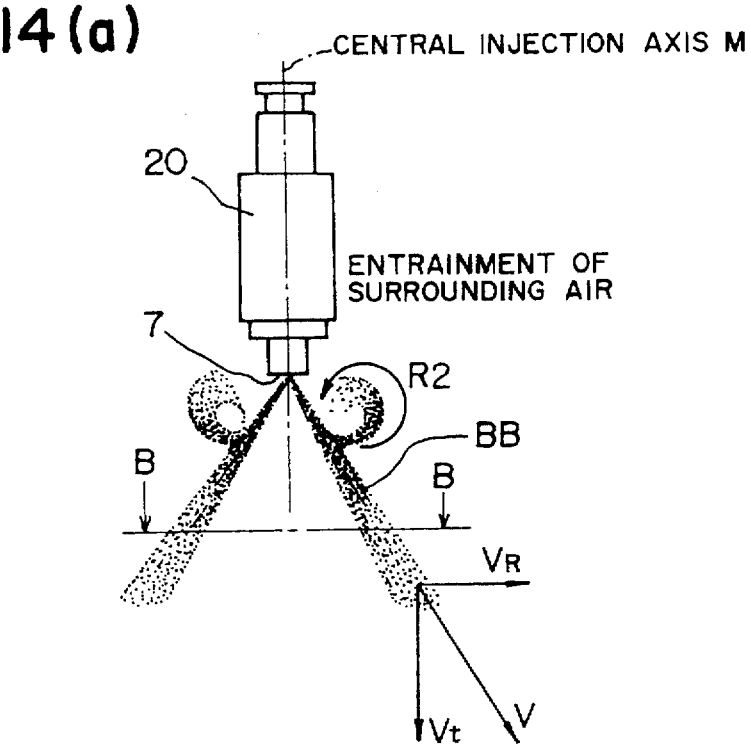
Figure 14B:
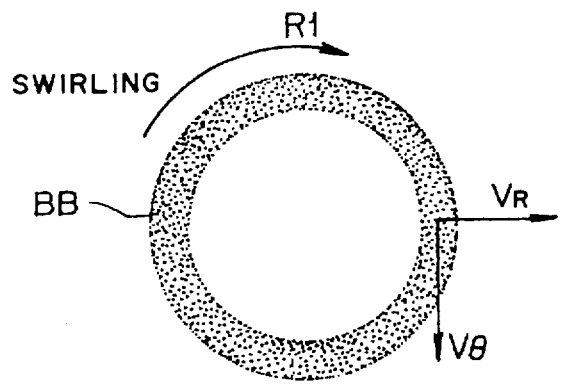

Namely, as is illustrated in FIG. 14(a) and FIG. 14(b), this fuel injection valve 30 forms practically or absolutely no core spray C and performs an injection of fuel in the form of a substantially conical peripheral spray B' alone. A spray in the form of such a peripheral spray B' alone will also be called a "hollow spray or hollow-cone spray BB". By reducing the dead volume 11 as much as possible, for example, in the fuel injection valve 30 of the construction as illustrated in FIG. 1, the substantially hollow spray (hollow-cone spray) BB can be formed while producing a swirling flow although the core spray C remains slightly.

Figure 16:
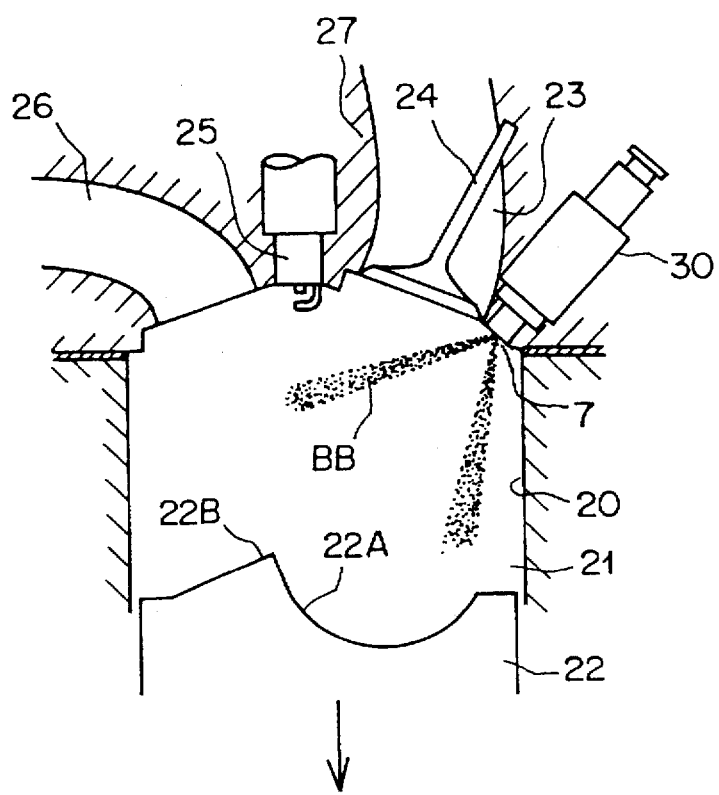
FIG. 16 is a schematic cross-sectional view showing the state of an injection of fuel in an intake stroke of the in-cylinder injection internal combustion engine according to the second embodiment of the present invention.

When such a hollow spray BB is injected in an intake stroke as shown in FIG. 16, the pressure of the fuel-injecting atmosphere at this time becomes atmospheric pressure or lower so that a wide-spread hollow-cone spray is formed as is illustrated in FIG. 14(a) and FIG. 14(b).

Namely, fuel is injected by high-pressure injection from the fuel injection valve 30. As is shown in FIG. 14(a) and FIG. 14(b), the resulting fuel flow has a swirling flow velocity component R1 and a velocity component directed in a diffusing direction along a conical plane as indicated by a velocity vector V. These velocity components R1 and V can be discussed by dividing them into a component V$\theta$ in a turning direction, a component VR directed in a centrifugal direction, and a component Vt directed in a direction along the central axis M of the injection. Under an atmosphere of atmospheric pressure or lower, these velocity components V$\theta$,VR,Vt are all large. It is therefore understood that the fuel is diffusing in the form of a cone.

Figure 17:
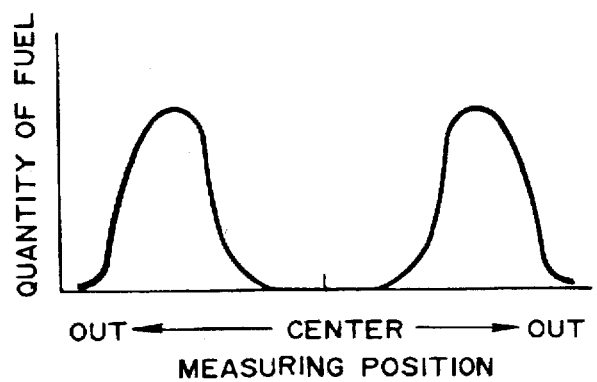
FIG. 17 is a diagram showing an injected fuel distribution by a fuel injection in the intake stroke of the in-cylinder injection internal combustion engine according to the second embodiment of the present invention.

A quantity distribution of fuel injected at this time has such a form that, as is illustrated in FIG. 17, the fuel quantity is extremely small in a vicinity of the central axis of the injection but is large in a part remote from the central axis of the injection. When fuel is injected as the substantially conical hollow spray (namely, wide-spread hollow-cone spray) BB, fuel particles are brought into contact with air on an outer side and inner side of a hollow-cone primary spray so that atomization of the fuel particles is promoted. As a consequence, the penetrativeness of the injected fuel is suppressed. In particular, an entrainment R2 of the surrounding air takes place on an outer side of the cone-shaped spray BB so that the promotion of atomization of the fuel particles and the suppression of their penetrativeness are enhanced still further.

Figure 15A:
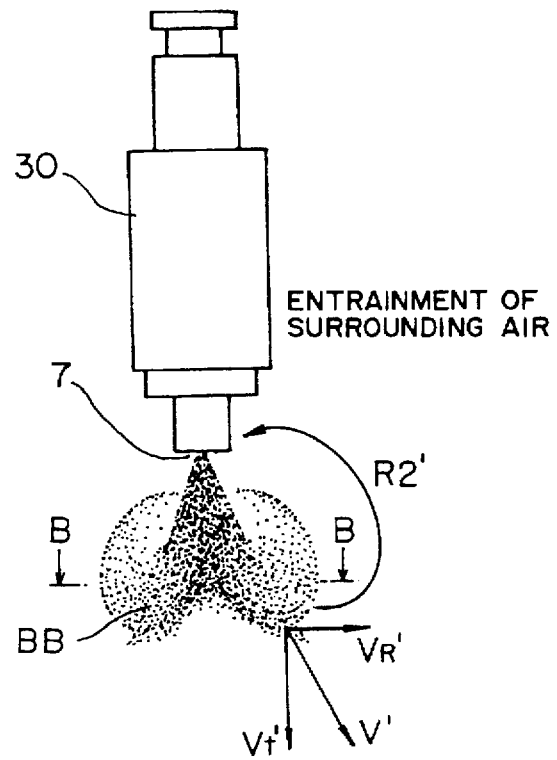
Figure 15B:
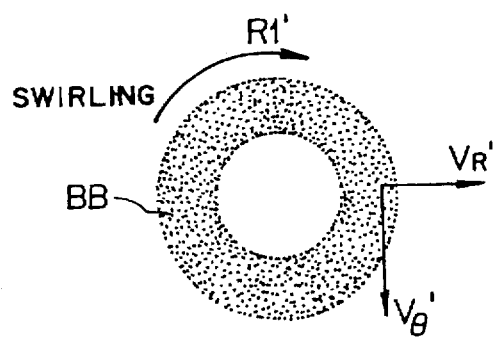
Figure 18:
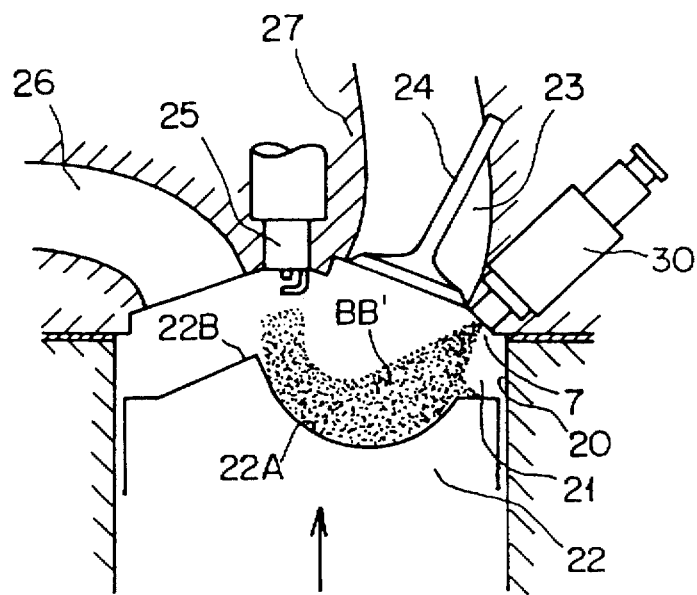
FIG. 18 is a schematic cross-sectional view showing the state of a fuel injection in a compression stroke of the in-cylinder injection internal combustion engine according to the second embodiment of the present invention.

On the other hand, when hollow spraying is performed in a compression stroke, especially in a latter stage of the compression stroke as is depicted in FIG. 18, the pressure of the fuel-injecting atmosphere at this time becomes very high, for example, 0.2 to 1.0 MPa so that a small-spread compact spray BB' is formed as is shown in FIG. 15(a) and FIG. 15(b).

The formation of the compact spray BB' under such an elevated pressure is considered to be attributable to the fact that the penetrativeness of sprayed fuel considerably differs depending on the pressure of the fuel-injecting atmosphere.

Described specifically, when fuel is injected by high-pressure injection from the fuel injection valve 30, velocity components R1' and V' of a fuel flow can be discussed, similarly to the case under atmospheric pressure, by dividing them into a component V$\theta$' in the turning direction, a component VR' directed in the centrifugal direction and a component Vt' directed in a direction extending along the central axis of the injection as shown in FIG. 15(a) and FIG. 15(b). Under an atmosphere of atmospheric pressure or lower, the respective velocity components V$\theta$',VR',Vt' are smaller compared with the corresponding velocity components under atmospheric pressure. Such a substantial reduction in the fuel velocity is considered to form the small-spread compact spray BB'.

As reasons, it is considered that, when the pressure of the fuel injecting atmosphere is high, the initial velocity of injected fuel is lowered and the fuel injected out of the fuel injection valve 30 spreads as a spray in an initial stage but is soon stalled, whereby the penetrativeness of the sprayed fuel is considerably reduced; and it is also considered that, because the velocity of the spray is lowered, the entrainment of the surrounding air, for example, in a main spray relatively becomes greater and the penetrativeness of the sprayed fuel is substantially reduced.

Figure 20:
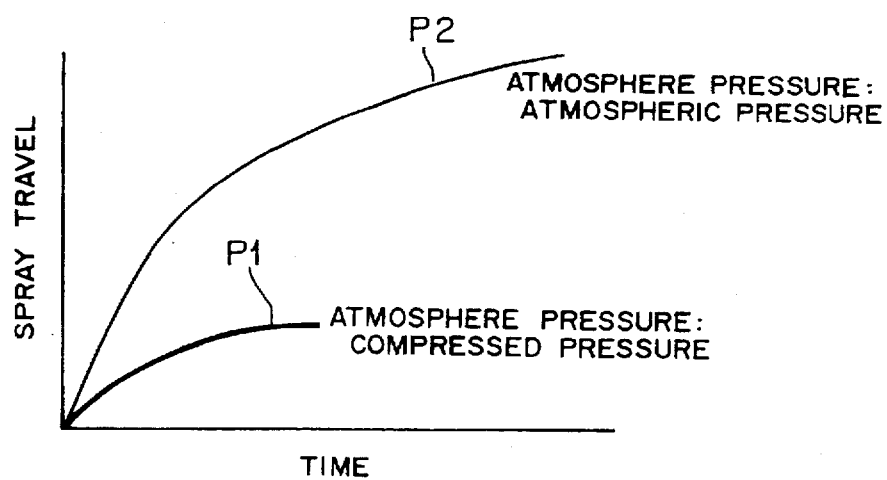
FIG. 20 is a diagram showing characteristics of a fuel spray by the in-cylinder injection internal combustion engine according to the second embodiment of the present invention.

Concerning spray travel characteristics which indicate penetrativeness, a comparison between a case where the pressure of a fuel-injecting atmosphere is a compressed pressure and another case where the pressure of a fuel-injecting atmosphere is atmospheric pressure can be diagrammatically illustrated as shown in FIG. 20. As is illustrated in the diagram, it is understood that in the case where the pressure of the fuel-injecting atmosphere is the compressed pressure (see a curve P1), the initial velocity of the spray velocity is low and the reduction in velocity is significant, both compared with the case where the pressure of the fuel-injecting atmosphere is atmospheric pressure (see a curve P2).

Figure 19:
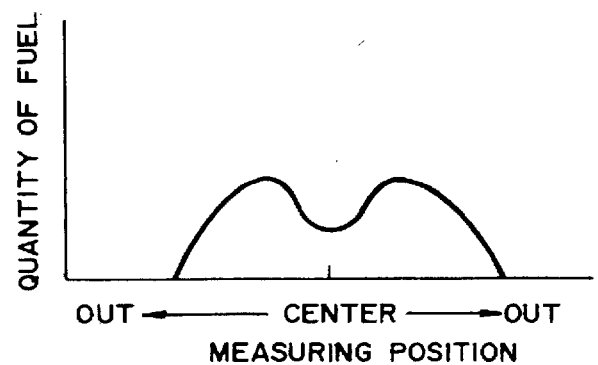
FIG. 19 is a diagram showing an injected fuel distribution by a fuel injection in the compression stroke of the in-cylinder injection internal combustion engine according to the second embodiment of the present invention.

A fuel quantity distribution when an injection of fuel is performed in a latter stage of a compression stroke as described above substantially concentrates in a vicinity of the central axis of the injection as is shown in FIG. 19.

Further, in this in-cylinder injection internal combustion engine, the timing of a fuel injection in the latter stage of the compression stroke is set as will be described next. Namely, as in the first embodiment, the curved wall recess 22A is also formed on the upper wall of the piston 22 in this engine. The timing of a fuel injection by the fuel injection valve 30 and the injecting direction of the fuel injection valve 30 (namely, the direction of the central axis of the injection) are set so that fuel, which has been fed into the combustion chamber in the latter stage of the compression stroke during an ascend of the piston 2 as shown by an arrow mark, first flows toward the recess 22A and after being reflected by the recess 22A, is caused to flow toward an ignition point of the spark plug 25 in an upper part of the combustion chamber 21.

Of course, the recess 22A is also configured so that the fuel injected from the fuel injection valve 30 can be reflected to have the fuel concentrated toward the point of ignition of the spark plug 25. Even if the fuel injected from the fuel injection valve 30 is spread, the recess 22A can focus the fuel so that upon ignition by the spark plug 25, the fuel can be locally fed at a sufficient concentration to a vicinity of the point of ignition.

Since the second embodiment of the present invention is constructed as mentioned above, an intake-stroke injection is performed by the fuel injection valve 30 as illustrated in FIG. 16 when the engine is in an operation state requiring a large fuel quantity, for example, when the load on the engine is high. This makes it possible to perform the operation so that a sufficient power output can be obtained from the engine.

Namely, when an injection of fuel is performed in an intake stroke, namely, while the piston 22 is descending as indicated by the arrow, a widely-spread hollow-cone spray BB is formed as shown in FIG. 14(a), FIG. 14(b) and FIG. 16. Such a widely-spread hollow-cone spray BB results in such a dispersed fuel quantity distribution as shown in FIG. 17. Fuel particles are brought into contact with air especially on an outer side and inner side of a main spray, respectively, so that the atomization of the fuel particles is promoted. As a result, the penetrativeness of the injected fuel is reduced. Accordingly, the ignition by the spark plug 25 is effected after the mixing between the fuel and air has been fully achieved. Extremely efficient combustion is therefore achieved so that a large engine power output can be obtained. Of course, this efficient combustion can also contribute to the reduction of HC and smoke in exhaust gas.

On the other hand, in the case of an engine operation state requiring a small fuel quantity, for example, when the load on the engine is low, a compression-stroke injection (in particular, an injection in a latter stage of a compression stroke is desired) is performed by the fuel injection valve 30 as shown in FIG. 18, thereby making it possible to perform an economical operation in which fuel consumption is saved.

When an injection is performed in a latter stage of a compression stroke, a small-spread compact spray BB' is formed as depicted in FIG. 15(a), FIG. 15(b) and FIG. 18.

When a compact spray BB' is formed as described above, the spray is practically centralized in a vicinity of the central axis of the injection. In this engine, the fuel which has been injected in the latter stage of the compression stroke is reflected by the recess 22A on the top wall of the piston 22 and, as the piston is lifted, is caused to flow toward the point of ignition of the spark plug 25 in the upper part of the combustion chamber 21. Upon reflection, the recess 22A reflects the fuel in such a way that the fuel is focused toward the point of ignition of the spark plug 25. Upon ignition by the spark plug 25, the fuel is locally supplied at a sufficient concentration to a vicinity of the point of ignition. It is therefore possible to perform an operation at an air/fuel ratio leaner than a stoichiometric air/fuel ratio (a lean-burn operation) as a whole while surely igniting the fuel and obtaining a stable combustion state.

Of course, the possibility of stable performance of a lean operation can also contribute to the reduction of HC and smoke in exhaust gas.

As has been described above, despite the formation of only the hollow spray (hollow-cone spray) BB without the core spray C, the engine according to this embodiment—while making use of the characteristics of the spray shape variable depending on the pressure of the fuel-injecting atmosphere and the reflection of fuel by the recess 22A on the top wall of the piston 22—can obtain a sufficient engine power output by a fuel injection in an intake stroke in an engine operation state requiring a large fuel quantity and can also achieve a stable lean operation by a fuel injection in a compression stroke in an engine operation state requiring a small fuel quantity. As a result, the engine according to this embodiment can bring about a still further advantage that the improvements in the power output and gas mileage of the engine and the reduction of HC and smoke in exhaust gas can be promoted further.

Depending on the characteristics of the engine, the engine may be operated with leaner fuel in some instances by performing a lean-burn operation based on a hollow spray (hollow-cone spray) BB focused onto the spark plug while making use of reflection of fuel by the recess 22A rather than by performing a lean-burn operation based on a core spray C.

In each of the above-described embodiments, a atomized cone-shaped fuel spray is formed by forming a strong swirling flow. Any spray form can however be used without relying upon a swirling flow insofar as an atomized cone-shaped fuel spray can be obtained.

Figure 21:
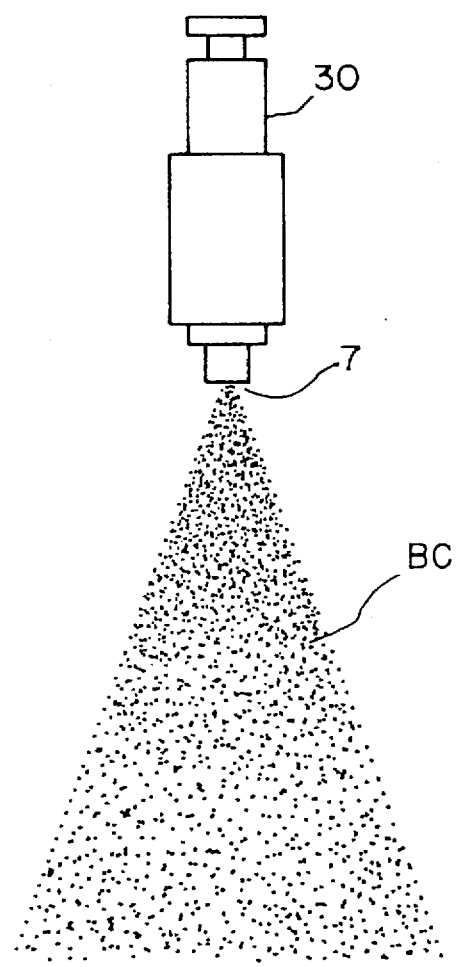
FIG. 21 is a schematic side view illustrating a fuel injection valve for an internal combustion engine according to a modification of the first and second embodiments of the present invention.

As a modification of the fuel spray shape from the fuel injection valve in the above-described first embodiment or second embodiment, it is possible to contemplate a shape such as that shown in FIG. 21.

As is indicated by sign BC in FIG. 21, fuel is sprayed in the form of a conical core. When a lean-burn operation is performed, such a core spray can increase the lean-limit air/fuel ratio as shown in FIG. 12 and is rather advantageous.

The fuel injection valve may be constructed so that in this core spraying, the particle size becomes smaller in a periphery-side spray in a vicinity of a conical surface of the injection than in a center-side spray in a vicinity of the central axis of the injection. In this manner, like a combined hollow/core spray, the periphery-side spray becomes more readily affected by the internal cylinder pressure so that upon injection in a compression stroke, the centralization of a spray is promoted.

By the way, a relationship of a recess with a fuel injection angle can be defined as will be described next.

The recess and fuel injection angle are set so that, when a large fuel quantity is required, namely, in the case of an injection in an intake stroke, a leading end of a fuel spray reaching the top wall of the piston is spread out of the recess 22A and the fuel spray is allowed to fully diffuse in the combustion chamber but, when a small fuel quantity is required, namely, in the case of an injection in a compression stroke (especially, an injection in a latter stage of a compression stroke), a leading end of a fuel spray reaching the top wall of the piston 22 is reduced in diameter to be received in the recess 22A and is then guided by the recess 22A toward the spark plug 25.

As a consequence, in the case of the injection in the intake stroke requiring the large fuel quantity, the diffusion of the fuel throughout the combustion chamber 21 is promoted and the combustion of the fuel is efficiently conducted, thereby making it easier to obtain a large power output. On the other hand, in the case of the injection in the compression stroke requiring the small fuel quantity, the fuel is locally fed into the recess 22A in the combustion chamber 21 and is then guided by the recess 22A. The fuel is therefore concentrated to be localized only in the vicinity of the point of ignition of the spark plug 25. An operation of low fuel consumption can therefore be achieved with the combustion chamber being controlled as a whole in a state of a lean fuel concentration while assuring stable ignitability of the fuel.

Describing the above-mentioned constitution in other words, an outer edge of the recess in relation to a fuel injection angle can be expressed in terms of the substantially the same piston positions in a former half of an intake stroke and a latter half of a compression stroke [for example, BTDC 300° (300° before the top dead center in an intake stroke, namely, 60° after the top dead center in an exhaust stroke) and BTDC 60° (60° before the top dead center in a compression stroke)] as will be mentioned next. For example, the size of the outer edge of the recess may preferably be set so that in the case of an injection of fuel from the fuel injection valve in a former half of an intake stroke, a contour of a spray at a leading end thereof upon reaching the top wall of the piston 22 is spread out of the recess 22A but in the case of an injection of fuel from the fuel injection valve in a latter half of a compression stroke, a contour of a spray at a leading end thereof upon reaching the top wall of the piston 22 is received within the recess 22A.

As a consequence, in the case of an injection of fuel from the fuel injection valve in a former half of an intake stroke, the fuel is allowed to diffuse not only in the recess 22A but also throughout the combustion chamber 21. A sufficient quantity of the fuel can therefore be fed to the whole combustion chamber while mixing it with air, thereby making it easier to efficiently obtain a large power output. On the other hand, in the case of an injection of fuel from the fuel injection valve in a latter half of an intake stroke, the fuel is received within the recess 22A so that a sufficient fuel concentration can be achieved in the recess 22A and in a space above the recess. It is therefore possible to achieve an operation of low fuel consumption with the combustion chamber being controlled as a whole in a state of a lean fuel concentration while assuring stabile ignitability of the fuel. Significant effects can be brought about when applied to an engine which performs pre-mixed combustion at the time of a high power output and also stratified combustion at the time of a low power output.

In the case of an injection in an intake stroke requiring a large fuel quantity, fuel can be mixed more fully inside the combustion chamber 21 to enhance the power-output-improving effects if a fuel spray can be set in such a way that a leading end of the fuel spray reaching the top wall of the piston not only spreads out of the recess 22A but also becomes wider than the entire top wall of the piston 22. This can be attributed not only to the injection angle but also the position of the top wall of the piston at the time of arrival of the spray there, namely, the injection timing. It is therefore necessary to set them in combination.

As each of the above-described embodiments, the in-cylinder injection internal combustion engine according to the present invention is to achieve both a higher power output by pre-mixed combustion and an improvement in gas mileage by stratified combustion. In other words, fuel is sprayed by an intake-stroke injection to spread throughout the cylinder so that a sufficient quantity of the fuel is more completely burnt to obtain a high power output. Further, fuel is sprayed in a compact size by a compression-stroke injection within the recess 22A on the top wall of the piston 22 so that the fuel is fed at a high concentration only to a vicinity of the point of ignition of the spark plug under the guidance by the inner wall of the recess 22A. By this stratification, it is intended to obtain the gas-mileage-improving effects.

By the way, the achievement of both a high power output and an improved gas mileage and the properties of exhaust gas are considerably affected by the shape of a spray (the atomization of fuel) from the fuel injection valve. Namely, the fuel injection valve for the internal combustion engine is provided with the fuel guide passage 10 as swirling-flow producing means. A swirling component is added to a flow of fuel so that the flow of fuel is injected as a swirling flow. As a consequence, the fuel so sprayed forms a peripheral spray B' as a conical, cone-shaped swirling flow B. The shape, namely, the state of spreading (cone-shaped injection angle, which will hereinafter be called a "spray angle" to distinguish it form the above-mentioned injection angles) of the cone-shaped swirling flow B significantly affects the achievement of both a high power output and an improved gas mileage and the properties of exhaust gas.

A further guideline is therefore needed for further enhancing the utility of the technology of such in-cylinder injection internal combustion engines. Included in this guideline are what fuel spray shape is suited for the achievement of both a high power output and an improved gas mileage and the properties of exhaust gas and from what viewpoint the shape of a fuel injection valve, especially the shape of its spray nozzle portion should be determined for the realization of such a desired fuel spray shape.

To this end, it is possible to specify, as will be described below, the shape of a fuel injection valve which can provide an adequate fuel spray shape.

Data of internal combustion engines usable in accordance with the first and second embodiments and those of internal combustion engines in respective experiments, which will be described subsequently herein, are set as follows:

Compression ratio: app. 8 to 12

SB ratio: app. 0.8 to 1.2

Injection pressure: app. 30 to 150 atm

A discussion will first be made about an adequate fuel spray shape. Before that, however, it is necessary to define this fuel spray shape so that the fuel spray shape can be evaluated by numerical data. A spray shape can be considered to be definable by the angle of a conical surface of a cone-shaped swirling flow B formed in the shape of a cone. Such an angle (cone-shaped injection angle or spray angle) can be detected by externally observing a spray. The spray shape of an actual cone-shaped swirling flow B is in the form of a conical surface having a thickness in the direction of an injection angle as shown in FIG. 8(a), FIG. 8(b) and FIG. 10. Such a spray angle can be detected based on the external appearance. These detections are however not always easy. Hence, a value called "horizontal flow-rate distribution centroid" will be used herein as an index for a spray shape.

Based on the results of a measurement of fuel quantities collected in the individual collection receptacles 12A of the multipoint collection receptacle for the measurement of horizontal flow-rate distribution centroids, this horizontal flow-rate distribution centroid can be determined in accordance with the following formula:

Horizontal flow-rate centroid=Σ(quantity of spray collected in each collection receptacles×injection angle)÷Σ(quantity of spray collected in each collection receptacle)

Namely, as has already been explained with reference to FIG. 9, a horizontal flow-rate distribution of fuel can be obtained, from the results based on this measurement system, as proportions Y relative to injection angles X as illustrated in FIG. 10. When a horizontal flow-rate distribution of such a fuel spray is detected in more detail by dividing each collection receptacle 12A further in the direction of the injection angle X, the results can be illustrated as shown in FIG. 22.

Figure 22:
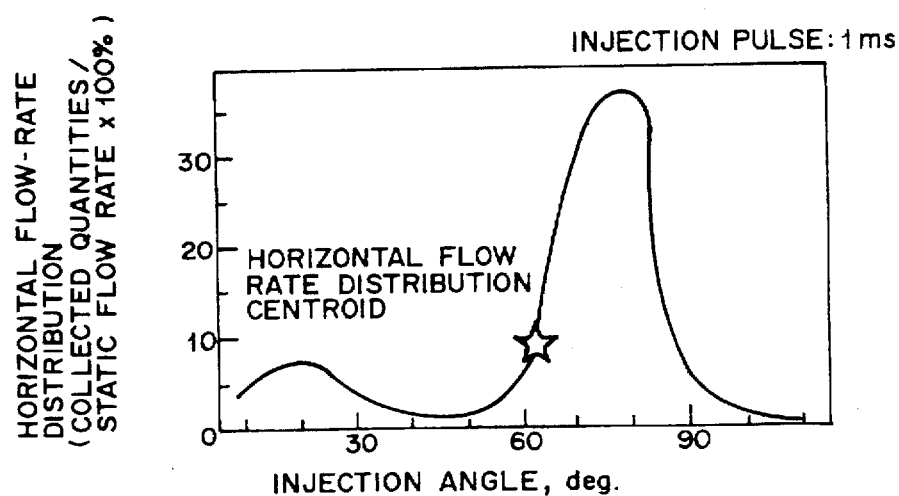
FIG. 22 is a diagram for explaining about the setting of a spray nozzle of a fuel injection valve for an internal combustion engine according to the present invention, and is a diagram showing a horizontal flow-rate distribution of fuel injected by the fuel injection valve.

In FIG. 22, injection angles (deg) are plotted along the abscissa, while quotients (horizontally distributed quantities), which have been obtained by dividing collected fuel quantities in the individual collection receptacles 12A by a static flow-rate of the fuel [fuel injection rate per unit time or unit pulse (injection pulse: 1 msec), are plotted along the ordinate]. From the measurement results, distribution characteristics as indicated by a curve (horizontally distributed quantity curve) in FIG. 22 is obtained. A horizontal flow-rate distribution centroid is a value which is equivalent to a weighted mean of injection angles weighted by their corresponding horizontally-distributed quantities obtained as described above, and is indicated by a star mark in FIG. 22.

Figure 23:
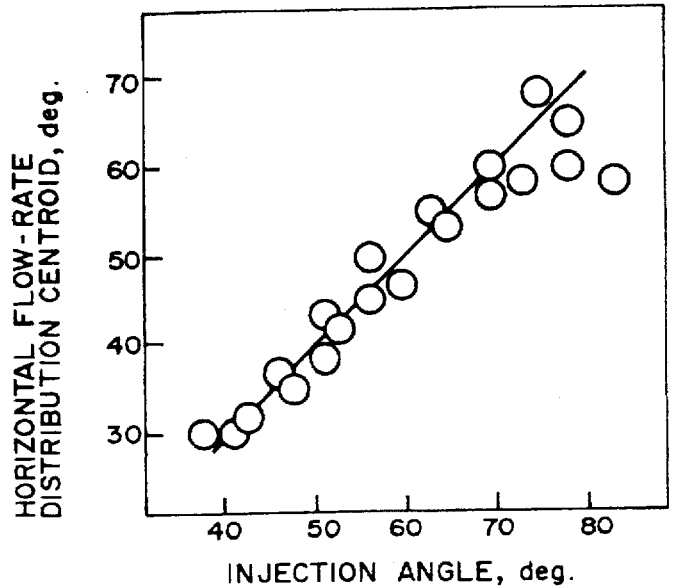
FIG. 23 is a diagram for explaining about the setting of a spray nozzle of a fuel injection valve for an internal combustion engine according to the present invention, and is a diagram for explaining a correlation between horizontal flow-rate distribution centroids of fuel injected by the fuel injection valve and injection angles (spray angles)

An investigation on a relationship between such horizontal flow-rate distribution centroids and spray angles (cone-shaped spray angles) of the cone-shaped swirling flow B gives the results such as those shown in FIG. 23. It is understood that horizontal flow-rate distribution centroids and spray angles are almost linearly correlated to each other. It is therefore understood that the use of a horizontal flow-rate distribution centroid as an index of a spray shape is reasonable.

When fuel is injected as a fuel spray (small-angle spray) having a small cone-shaped spray angle and a horizontal flow-rate distribution centroid smaller than a predetermined angle, problems are induced at the time of a full-power operation, including occurrence of smoke, a reduction in power output, and a deterioration in gas mileage upon injection in compression strokes. On the other hand, when fuel is injected as a fuel spray (broad angle spray) having a wide cone-shaped spray angle and a horizontal flow-rate distribution centroid greater than a predetermined angle, the combustion at the time of injection in compression strokes becomes unstable or variations of sprays due to differences between individual injection valves themselves become great, thereby making it difficult to surely obtain a desired spray shape.

Now, firstly, paying attention to an improvement in gas mileage, characteristics of a gas mileage relative to a horizontal flow-rate distribution centroid (cone-shaped spray angle) can be illustrated as shown in FIG. 24. A horizontal flow-rate distribution centroid capable of providing a good gas mileage is considered to range from 40 to 70 deg (50 to 80 deg in terms of cone-shaped spray angle) as indicated by halftone dot meshing in FIG. 24. Namely, as far as gas mileage is concerned, the appropriate horizontal flow-rate distribution centroid is considered to range from 40 to 70 deg.

Accordingly, an investigation will be made to determine the shape of a fuel injection valve which can provide such an appropriate horizontal flow-ate distribution centroid (40 to 70 deg).

Figure 25A:
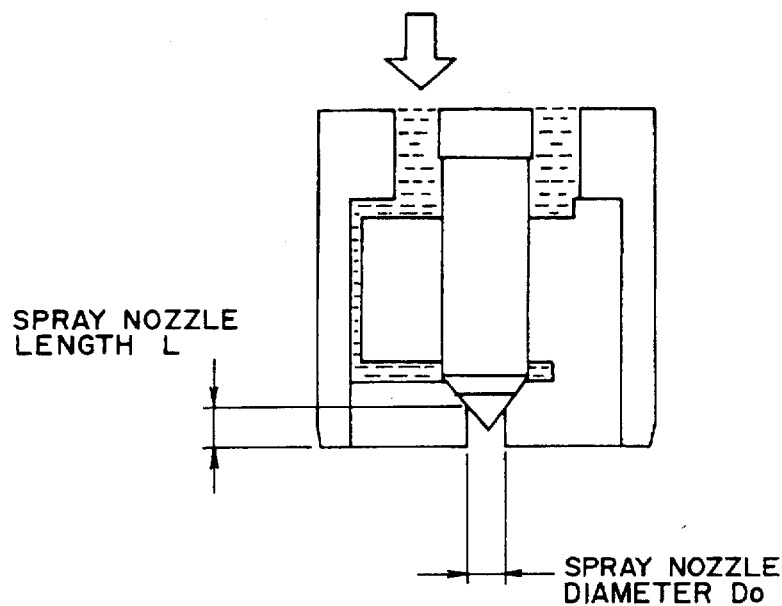
Figure 25B:
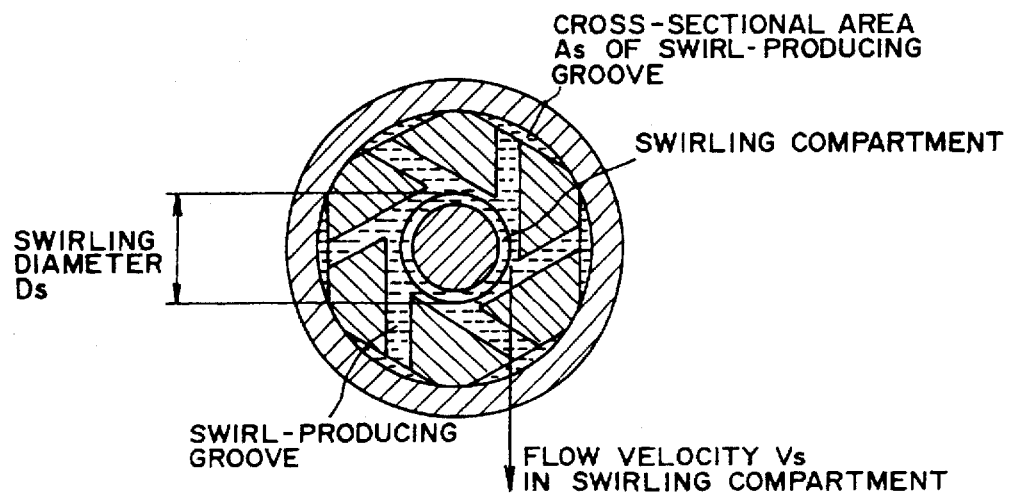

Firstly, based on the date of a fuel injection valve, namely, its spray nozzle diameter Do, spray nozzle length L, swirling diameter Ds, and cross-sectional area As of swirl-producing groove [see FIG. 25(a) and FIG. 25(b)] and the fuel pressure P, fuel density $\rho$ and kinematic viscosity $\nu$ of gasoline fuel, a flow rate Vs in a swirling compartment [see FIG. 25(b)], a swirling Reynolds number Re and the L/D ratio of a spray nozzle can be expressed by the following formulas:

$$Vs = K \cdot (Do/Ds) \cdot (2P/\rho)^{0.5}$$

where, $$\{(1/K)^2 - 1\}^{0.5} K \cdot \ln[1/K + \{(1/K)^2 - 1\}^{0.5}] = 4 \cdot As/(\pi \cdot Do \cdot Ds)$$

Swirling Reynolds number $Re = Ds \cdot Vs/2\nu$

L/D of spray nozzle = L/Do

Figure 26:
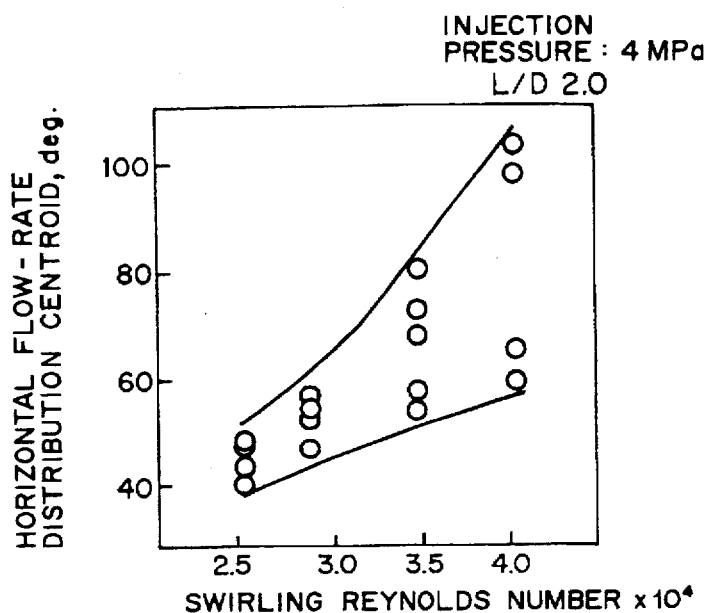
FIG. 26 is a diagram for explaining about the setting of a spray nozzle in a fuel injection valve for an internal combustion engine according to the present invention, and is a diagram showing variations of a spray relative to swirling Reynolds numbers.

FIG. 26 shows the results of an experiment about characteristics of horizontal flow-rate distribution centroids relative to swirling Reynolds numbers Re when the L/D of the spray nozzle was set constant (in the experiment, L/D=2) and the injection pressure was set at 4 MPa. It is appreciated that a greater swirling Reynolds number Re results in greater variations in the horizontal flow-rate distribution centroid due to a machining error of the spray nozzle or the like upon machining the injection valve, thereby making it more difficult to obtain a desired spray shape. From the viewpoint of reducing variations in the horizontal flow-rate distribution centroid, a smaller swirling Reynolds number Re is advantageous.

Figure 27:
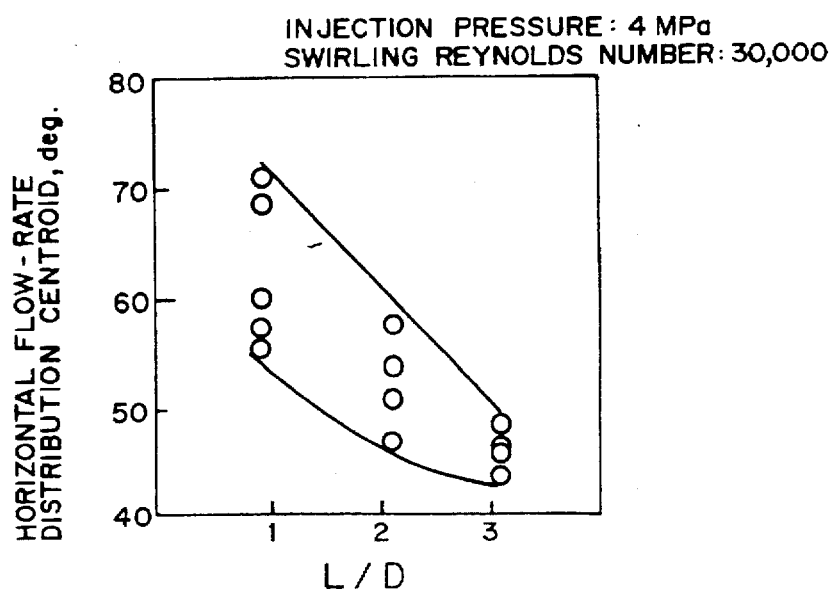
FIG. 27 is a diagram for explaining about the setting of a spray nozzle in a fuel injection valve for an internal combustion engine according to the present invention, and is a diagram showing variations of a spray relative to ratios (L/D) of spray nozzle lengths to spray nozzle diameters.

FIG. 27 depicts the results of an experiment about characteristics of horizontal flow-rate distribution centroids relative to L/Ds of the spray nozzle when the swirling Reynolds number Re was set constant (in the experiment, Re=30,000) and the injection pressure was set at 4 MPa. It is appreciated that a smaller L/D ratio of the spray nozzle leads to greater variations in the horizontal flow-rate distribution centroid, thereby making it more difficult to obtain a desired spray shape. From the viewpoint of reducing variations in the horizontal flow-rate distribution centroid, a greater L/D ratio of the spray nozzle is advantageous.

Figure 28:
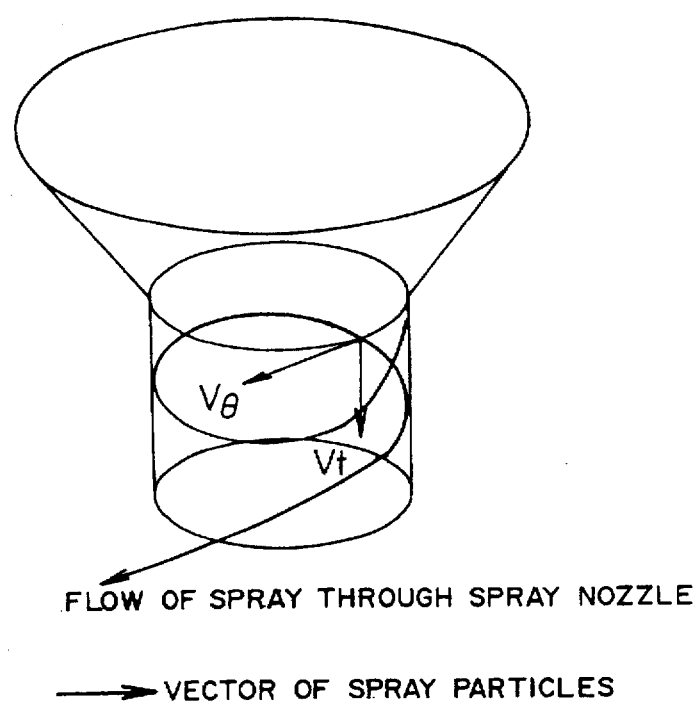
FIG. 28 is a diagram for explaining about the setting of a spray nozzle in a fuel injection valve for an internal combustion engine according to the present invention, and is a perspective view schematically illustrating a swirling flow by showing the inside of the spray nozzle in a see-through fashion.

Concerning the L/D ratio of the spray nozzle, an increase in this ratio makes it possible to reduce variations in the horizontal flow-rate distribution centroid and hence to reduce differences between individual injection valves themselves because, as is illustrated in FIG. 28, a swirling flow of fuel imparted with swirling force helically circles in the spray nozzle to reduce spreading of a spray and at the same time, averages dimensional variations between the swirl-producing grooves in the spray nozzle to stabilize the spray.

It is particularly preferred that such a swirling flow is injected out after circling at least one full turn at an injecting portion (a portion where the spray nozzle has a diameter Ds) of the spray nozzle.

However, a great L/D ratio of the spray nozzle may cause formation of a deposit of carbon in the spray nozzle. There is accordingly a limitation to the enlargement of the L/D ratio of the spray nozzle.

Taking these characteristics into consideration, the L/D ratio of the spray nozzle can desirably be in a range of from 1 to 3 or so.

Figure 29:
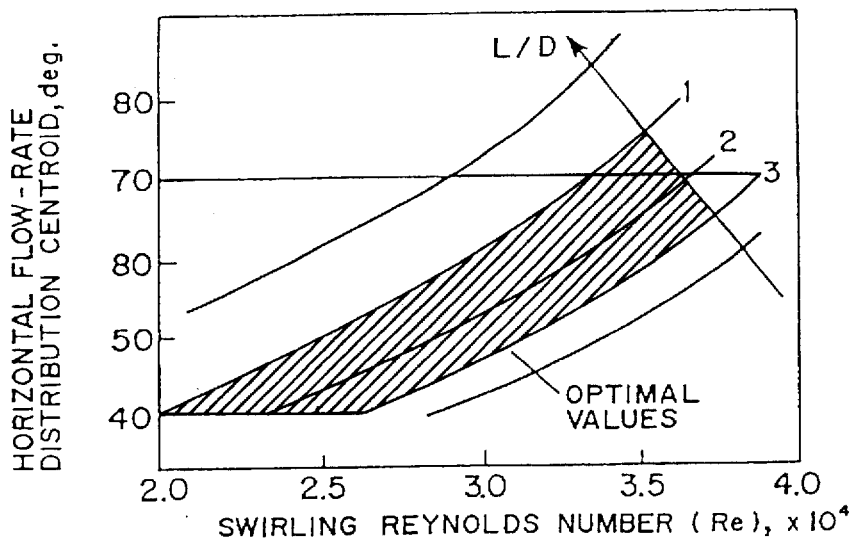
FIG. 29 is a diagram for explaining about the setting of a spray nozzle in a fuel injection valve for an internal combustion engine according to the present invention, and is a diagram showing characteristics of horizontal flow-rate distribution centroids relative to swirling Reynolds numbers for different L/D ratios.

Further, FIG. 29 shows horizontal flow-rate distribution centroids relative to swirling Reynolds numbers Re for individual L/D ratios of the spray nozzle when the injection pressure of the injection valve was set at 4 MPa. It is appreciated that swirling Reynolds numbers corresponding to the above-described appropriate horizontal flow-rate distribution centroids (40 to 70 deg) range from 20,000 to 40,000 or so. Accordingly, when the injection pressure is set at 4 MPa, it is preferred to set the individual data of a fuel injection valve so that its swirling Reynolds number Re and horizontal flow-rate distribution centroid and the L/D ratio of its spray nozzle are set within an area indicated by half-tone dot meshing in FIG. 29.

It is however to be noted that the horizontal flow-rate distribution centroid is also dependent on the fuel pressure P. When an injection pressure other than the above-described 4 MPa is considered, an optimal fuel injection state can be more accurately expressed by using the horizontal flow-rate distribution centroid and the fuel pressure P. Thus, based on experimental data, an index of a fuel injection state with the horizontal flow-rate distribution centroid and the fuel pressure P incorporated therein can be derived $$\text{Horizontal flow-rate distribution centroid} \times \text{fuel pressure } P^{0.25}$$

Also, paying attention to the fact that a swirling Reynolds number Re is a function of the square root of a fuel pressure P, the swirling Reynolds number Re can set a value obtained by dividing it with the square root of the fuel pressure P (Re/√P). From the correspondence between this value (Re/√P) and the horizontal flow-rate distribution centroid, an appropriate value (Re/√P) can be determined. Incidentally, the unit of the value (Re/√P) is [1/Pa$^{0.5}$].

Figure 30:
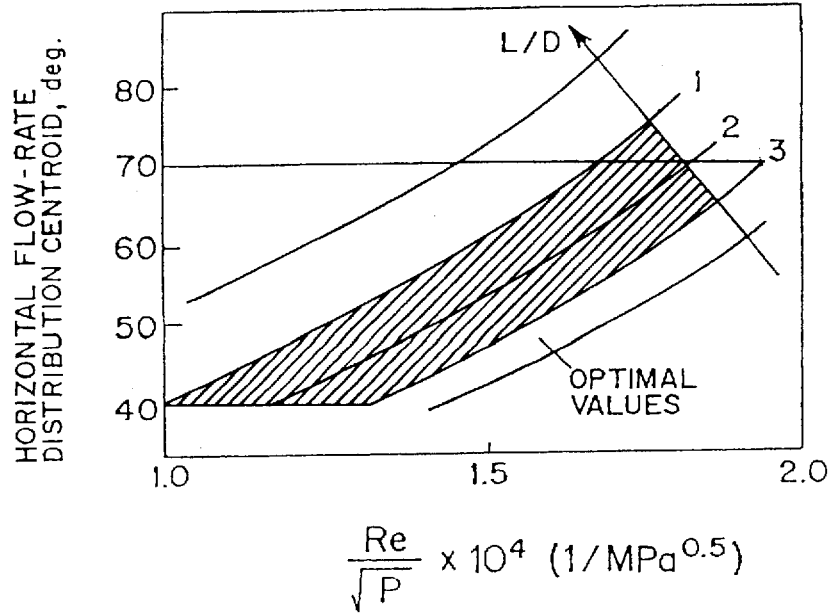
FIG. 30 is a diagram for explaining about the setting of a spray nozzle in a fuel injection valve for an internal combustion engine according to the present invention, and is a diagram showing characteristics of horizontal flow-rate distribution centroids relative to values (Re/√P) based on swirling Reynolds numbers (Re) and fuel pressures (P) for different L/D ratios.

FIG. 30 shows horizontal flow-rate distribution centroids corresponding to these values (Re/√P) for individual L/D ratios of the spray nozzle. As is shown in the diagram, setting of the value (Re/√P) within a range of from 10,000 to 20,000 [1/MPa$^{0.5}$] can provide an index of an appropriate fuel injection state (namely, a horizontal flow-rate distribution centroid).

As far as the value (Re/√P) is concerned, it is preferred to set the individual data of the spray nozzle 7 within an area indicated by halftone dot meshing in FIG. 30.

Figure 31:
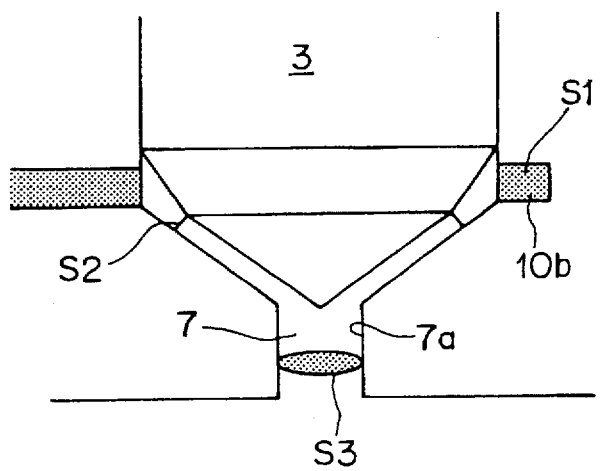
FIG. 31 is a diagram for explaining about the setting of a spray nozzle in a fuel injection valve for an internal combustion engine according to the present invention, and is a fragmentary longitudinal cross-sectional view showing the spray nozzle on an enlarged scale.

A description will also be made of a guideline for a limitation to the area of an opening at a valve seat portion. FIG. 31 is a schematic view illustrating a valve seat and its vicinity portion in a spray nozzle. A passage area S1 of a swirl-producing groove, the area S2 of the opening at the valve seat portion (the area of an opening between a valve seat and a needle valve at closest parts thereof when the valve is at a maximum lift) and the cross-sectional area S3 of the spray nozzle can desirably be set within the following ranges.

$$0.5 \leq S3/(S1 \times \text{the number of swirl-producing grooves}) \leq 1.5$$

$$0.1 \leq S2/(S1 \times \text{the number of swirl-producing grooves}) \leq 0.5$$

Especially, a value around 1.0 is considered to be optimal as the value of S3/(S1×the number of swirl-producing grooves) although it varies depending on the conditions. In view of the diversity of conditions, the value can be set within the range of from 0.5 to 1.5 as described above. A value of S3/(S1×the number of swirl-producing grooves) smaller than 0.5 involves a potential problem that the swirling force may become too small. In contrast, a value of S3/(S1×the number of swirl-producing grooves) greater than 1.5 involves a potential problem that the swirling force may become excessively large.

On the other hand, a value around 0.2 is considered to be optimal as the value of S2/(S1×the number of swirl-producing grooves) although it varies depending on the conditions. In view of the diversity of the conditions, the value can be set within the range of from 0.1 to 0.5 as described above. A value of S2/(S1×the number of swirl-producing grooves) smaller than 0.1 involves a potential problem that the swirling flow rate may be limited to result in an unduly small flow rate. In contrast, a value of S2/(S1× the number of swirl-producing grooves) greater than 0.5 involves a potential problem that sufficient swirling force may not be obtained.

In practice, some or all of the passage area S1 of the swirl-producing groove, the area S2 of the opening at the valve seat portion and the cross-sectional area S3 of the spray nozzle of the injection value are limited to some extents in view of its dimensional reduction and responsibility. Under these various limitations, they are set to fall within the above-mentioned ranges.

Upon making such setting, it is particularly preferred to set the area S2 of the opening at the valve seat smaller than the passage area S1 of the swirl-producing groove and the cross-sectional area S3 of the spray nozzle from the standpoint of the dimensional reduction and responsibility of the injection valve.

By setting various data of the fuel injection valve from the above-mentioned viewpoints, the above-mentioned effects of the in-cylinder injection internal combustion engine according to the present invention can be more readily obtained.

Capability of Exploitation in Industry

Use of the present invention in a 4-cycle in-cylinder injection internal combustion engine, which performs pre-mixed combustion at the time of a high power output and stratified combustion at the time of a low output, makes it possible to fully achieve assurance of an engine power output by the pre-mixed combustion and also to surely perform a fuel-saved operation by the stratified combustion, so that mutually contradicting demands such as an increase in power output and an improvement in gas mileage can be met together. Adoption of such an in-cylinder injection internal combustion engine, for example, as an engine for an automotive vehicle can significantly improve the performance, that is, the power output performance and economical performance of the automotive vehicle. Its applicability is of course not limited to automotive vehicles. In such applications, it can bring about the advantage that improvements in the power output performance and improvements in the economical performance can be both achieved. Its utility is therefore considered to be extremely high.

We claim:

1. A 4-cycle in-cylinder injection internal combustion engine, comprising:

a combustion chamber formed between a top wall of a reciprocating piston fittedly inserted in a cylinder and a lower wall of a cylinder head;

a single fuel injection valve for injecting fuel directly into said combustion chamber; and a spark plug facing on said combustion chamber, wherein said fuel injection valve performs an injection of fuel into said combustion chamber in the form of a spray evenly spreading out in a conical shape from a spray nozzle as a vertex in a direction of an axis of said fuel injection valve, and wherein, when said engine is in an operation state in which fuel is required in a large quantity, performs said injection of fuel in an intake stroke of said engine and, when said engine is in an operation state in which fuel is required in a small quantity, performs said injection of fuel so that fuel is fed in a latter half of a compression stroke of said engine in which an internal cylinder pressure is higher than that in said intake stroke.

2. The in-cylinder injection internal combustion engine of claim 1, wherein, when fuel is required in a small quantity, said fuel injection valve performs said injection of fuel into said combustion chamber where an atmospheric pressure has reached 2 atm or higher.

3. The in-cylinder injection internal combustion engine of claim 1, wherein said spray of fuel injected from said fuel injection valve has a shape conically spreading out at a predetermined injection angle toward a leading end of said spray when fuel is required in a large quantity, and, when fuel is required in a small quantity, has a shape that toward said leading end of said spray, a degree of diametrical spreading of said spray becomes progressively smaller and said shape is then gradually reduced in diameter.

4. The in-cylinder injection internal combustion engine of claim 3, wherein a recess is formed at a part of said top wall of said piston and said spark plug is arranged at a position opposite said recess, whereby, when fuel is required in a large quantity, said leading end of said spray spreads out of said recess and diffuses in said combustion chamber and, when fuel is required in a small quantity, said leading end of said spray is guided toward said spark plug by said recess while being reduced in diameter so that, when said leading end of said spray reaches said top wall of said piston, said leading end of said spray is received in said recess and is locally positioned in a vicinity of an ignition point of said spark plug.

5. The in-cylinder injection internal combustion engine of claim 3, wherein said fuel injection valve is a swirl-type fuel injection valve provided with an injection valve main body having said spray nozzle, open/close means arranged within said injection valve main body having said spray nozzle, and swirl-producing means arranged in said open/close means for forming fuel, which flows through said injection valve main body, into a cone-shaped swirl.

6. The in-cylinder injection internal combustion engine of claim 5, wherein said engine is further provided with:

an intake port formed in said lower wall of said cylinder head on one side of a reference plane, in which a central axis of said cylinder is contained, and an intake valve arranged in said intake port to open or close an opening of said intake port to said combustion chamber;

a curved wall recess formed in said top wall of said cylinder at a position facing said opening of said intake port on said one side of said reference plane so that said recess is set back relative to said top wall of said cylinder to promote vertical swirl of inducted air advanced from said intake port into said combustion chamber;

a raised portion formed on said top wall of said cylinder on an opposite side of said reference plane with a top portion of said raised portion being arranged near said reference plane so that said raised portion rises from said recess and approaches close to said lower wall of said cylinder head at a top dead center of said piston; and a spark plug arranged on said lower wall of said cylinder head at a position near said central axis of said cylinder;

and wherein said spray nozzle of said fuel injection valve is arranged so that said spray nozzle is directed toward said recess.

7. The in-cylinder injection internal combustion engine of claim 1, wherein said shape of said spray is composed of a core spray, which has a small spray angle so that said core spray concentrates in a vicinity of said axis of said fuel injection valve, and a conical peripheral spray having a greater spray angle than said core spray and spaced apart from said core spray to surround an outer periphery of said core spray.

8. The in-cylinder injection internal combustion engine of claim 7, wherein said fuel injection valve is a swirl-type fuel injection valve provided with an injection valve main body having a spray nozzle, open/close means arranged within said injection valve main body for opening/closing said spray nozzle, and swirl-producing means arranged in said open/close means for forming fuel, which flows through said injection valve main body, into a cone-shaped swirl.

9. The in-cylinder injection internal combustion engine of claim 1, wherein said shape of said spray of fuel injected from said fuel injection valve is set so that, when said fuel is injected in a former half of an intake stroke, said spray has a shape progressively enlarged in diameter at an angle equal to or greater than a predetermined angle toward a leading end of said spray and, when said fuel is injected in a latter half of a compression stroke, said spray has a shape progressively reduced in diameter at an angle smaller than said predetermined angle toward said leading end of said spray;

and wherein a recess is formed in said top wall of said piston at a part thereof, and an outer edge of said recess is set smaller than a spray contour of said outer end of said spray reaching said top wall of said piston when said fuel is injected from the fuel injection valve during said former half of said intake stroke and said piston is at a certain position, and said outer edge of said recess is set greater than a spray contour of said outer end of said spray reaching said top wall of said piston when said fuel is injected from said fuel injection valve during said latter half of said compression stroke and said piston is at about said certain position.

10. The in-cylinder injection internal combustion engine of claim 1, wherein said fuel injection valve is a swirl-type fuel injection valve provided with an injection valve main body having said spray nozzle, open/close means arranged within said injection valve main body and having a contact portion, which can be brought into close contact with an inner peripheral wall forming said spray nozzle at a free end thereof, and swirl-producing means arranged right above said contact portion for guiding fuel, which flows inside said injection valve main body, toward said spray nozzle so that a swirling component is imparted to said flowing fuel to produce a swirl;

a ratio (L/D) of a length (L) from said contact portion to a free end of said spray nozzle to a smallest inner diameter (D) of said spray nozzle is set within a range of from 1 to 3 so that an angle of a horizontal flow rate distribution centroid of fuel injected from said fuel injection valve, as obtained by measuring a horizontal flow rate distribution, falls within a range of from 40 to 70 degrees; and a value (Re/$\sqrt{P}$) having a unit of $\{1/MPa^{0.5}\}$ and obtained from a swirling Reynolds number (Re) at said spray nozzle, said swirling Reynolds number being defined based on a swirling diameter (Ds) of said swirl, a swirling velocity (Vs) of said swirl and a kinematic viscosity (v) of fuel in accordance with a formula $\{Re=Ds \cdot Vs/2v)\}$, and an injection pressure (P) of said fuel injection valve is set within a range of from 10,000 to 20,000.

* * * * *